US011072034B2

(12) United States Patent
Daniel et al.

(10) Patent No.: US 11,072,034 B2
(45) Date of Patent: Jul. 27, 2021

(54) SYSTEM AND METHOD OF EXPORTING OR USING WELDING SEQUENCER DATA FOR EXTERNAL SYSTEMS

(71) Applicant: LINCOLN GLOBAL, INC., City of Industry, CA (US)

(72) Inventors: Joseph A. Daniel, Sagamore Hills, OH (US); Edward Enyedy, Eastlake, OH (US); James Hearn, Brunswick, OH (US)

(73) Assignee: LINCOLN GLOBAL, INC., City Of Industry, CA (US)

( * ) Notice: Subject to any disclaimer, the term of this patent is extended or adjusted under 35 U.S.C. 154(b) by 660 days.

(21) Appl. No.: 13/803,032

(22) Filed: Mar. 14, 2013

(65) Prior Publication Data

US 2014/0042136 A1 Feb. 13, 2014

Related U.S. Application Data

(63) Continuation-in-part of application No. 11/613,652, filed on Dec. 20, 2006, now Pat. No. 9,104,195.

(51) Int. Cl.
*B23K 9/095* (2006.01)
*G05B 19/418* (2006.01)

(52) U.S. Cl.
CPC ........ *B23K 9/0953* (2013.01); *G05B 19/4183* (2013.01); *G05B 2219/35528* (2013.01);
(Continued)

(58) Field of Classification Search
CPC .... B23K 9/095; B23K 9/0953; B23K 9/0956; G05B 19/4183; G05B 2219/35528; G05B 2219/35529; G05B 2219/45135
(Continued)

(56) References Cited

U.S. PATENT DOCUMENTS 3,581,051 A 5/1971 Brown et al.
3,689,734 A 9/1972 Burley et al.
(Continued)

FOREIGN PATENT DOCUMENTS

CH 688034 1/1993
CN 1370654 A 9/2002
(Continued)

OTHER PUBLICATIONS

Receive synonyms, receive antonyms—thesaurus.com.*
(Continued)

*Primary Examiner* — Tu B Hoang
*Assistant Examiner* — Vy T Nguyen
(74) *Attorney, Agent, or Firm* — Calfee, Halter & Griswold LLP

(57) ABSTRACT

The invention described herein generally pertains to a system and method for collecting one or more welding parameters in real time during creation of one or more welds using a welding sequence. The one or more welding parameters can be associated with a particular welding sequence. Moreover, based on the one or more welding parameters collected, a modeled welding parameter can be generated to increase quality, efficiency, and the like. A collection component collects real time welding parameter data from which a quality manager component creates a modeled welding parameter. The modeled welding parameter can be employed for the welding sequence to monitor or track the welding parameter during a subsequent weld.

20 Claims, 12 Drawing Sheets

(52) U.S. Cl.
CPC .............. *G05B 2219/35529* (2013.01); *G05B 2219/45135* (2013.01); *Y02P 90/02* (2015.11)

(58) Field of Classification Search
USPC ... 219/130.01, 130.1, 130.5, 130.51, 130.21, 219/130.31, 130.32, 130.33
See application file for complete search history.

(56) References Cited

U.S. PATENT DOCUMENTS

| | | | |
|---|---|---|---|
| 3,847,584 A | 11/1974 | Houser | |
| 4,104,724 A | 8/1978 | Dix et al. | |
| 4,145,593 A | 3/1979 | Merrick et al. | |
| 4,324,973 A | 4/1982 | Kirwan et al. | |
| 4,380,696 A | 4/1983 | Masaki | |
| 4,390,954 A | 6/1983 | Manning | |
| 4,419,560 A | 12/1983 | Zurek | |
| 4,419,562 A | 12/1983 | Jon et al. | |
| 4,459,457 A * | 7/1984 | Jurek | B23K 11/24 219/110 |
| 4,477,713 A | 10/1984 | Cook et al. | |
| 4,497,019 A | 1/1985 | Waber | |
| 4,527,045 A | 7/1985 | Nakajima | |
| 4,681,999 A | 7/1987 | Hruska | |
| 4,785,159 A | 11/1988 | Hruska | |
| 4,881,678 A | 11/1989 | Gaudin | |
| 4,920,248 A | 4/1990 | Toyoda et al. | |
| 5,081,338 A | 1/1992 | Dufrenne | |
| 5,206,474 A | 4/1993 | Fukuoka | |
| 5,265,787 A | 11/1993 | Ishizaka et al. | |
| 5,278,390 A | 1/1994 | Blankenship | |
| 5,380,978 A | 1/1995 | Pryor | |
| 5,493,093 A | 2/1996 | Cecil | |
| 5,532,452 A * | 7/1996 | Lechner | B23K 9/1274 219/124.34 |
| 5,651,903 A | 7/1997 | Shirk | |
| 5,708,253 A | 1/1998 | Bloch et al. | |
| 5,773,779 A | 6/1998 | Morlock | |
| 5,859,847 A | 1/1999 | Dew et al. | |
| 5,866,866 A | 2/1999 | Shimada | |
| 5,877,468 A | 3/1999 | Morlock | |
| 5,906,761 A * | 5/1999 | Gilliland | B25J 9/1671 219/124.34 |
| 5,910,894 A | 6/1999 | Pryor | |
| 6,023,044 A | 2/2000 | Kosaka et al. | |
| 6,063,458 A | 5/2000 | Robertson et al. | |
| 6,087,627 A | 7/2000 | Kramer | |
| 6,115,273 A | 9/2000 | Geisler | |
| RE36,926 E | 10/2000 | Austin | |
| 6,133,545 A | 10/2000 | Okazaki et al. | |
| 6,151,640 A | 11/2000 | Buda et al. | |
| 6,236,017 B1 * | 5/2001 | Smartt | B23K 9/093 219/130.01 |
| 6,267,291 B1 | 7/2001 | Blankenship et al. | |
| 6,278,074 B1 | 9/2001 | Molock et al. | |
| 6,292,715 B1 | 9/2001 | Hsu | |
| 6,399,912 B1 | 6/2002 | Steenis et al. | |
| 6,444,942 B1 | 9/2002 | Kawai et al. | |
| 6,492,618 B1 | 12/2002 | Flood et al. | |
| 6,548,783 B1 | 4/2003 | Kilovsky et al. | |
| 6,583,386 B1 | 6/2003 | Ivkovich | |
| 6,624,388 B1 | 9/2003 | Blankenship et al. | |
| 6,636,776 B1 | 10/2003 | Barton et al. | |
| 6,700,097 B1 | 3/2004 | Hsu et al. | |
| 6,708,385 B1 | 3/2004 | Lemelson | |
| 6,710,298 B2 | 3/2004 | Eriksson | |
| 6,717,108 B2 | 4/2004 | Hsu | |
| 6,734,394 B2 | 5/2004 | Hsu | |
| 6,747,247 B2 | 6/2004 | Holverson | |
| 6,822,195 B2 | 11/2004 | Kanodia et al. | |
| 6,847,922 B1 | 1/2005 | Wampler, II | |
| 6,847,956 B2 | 1/2005 | Manicke et al. | |
| 6,912,447 B2 | 6/2005 | Klimko et al. | |
| 6,924,459 B2 | 8/2005 | Spear et al. | |
| 6,930,280 B2 | 8/2005 | Zauner et al. | |
| 6,995,665 B2 | 2/2006 | Appelt et al. | |
| 7,028,882 B2 | 4/2006 | Kilovsky et al. | |
| 7,030,334 B1 | 4/2006 | Ruiz et al. | |
| 7,032,814 B2 | 4/2006 | Blankenship | |
| 7,072,774 B1 | 7/2006 | Houston | |
| 7,102,098 B2 | 9/2006 | Rouault et al. | |
| 7,358,458 B2 | 4/2008 | Daniel | |
| 7,523,069 B1 | 4/2009 | Friedl | |
| 7,539,603 B2 * | 5/2009 | Subrahmanyam | G06F 17/50 219/121.63 |
| 7,603,191 B2 | 10/2009 | Gross | |
| 7,617,017 B2 | 11/2009 | Menassa et al. | |
| 7,642,486 B2 | 1/2010 | Fosbinde et al. | |
| 7,772,524 B2 | 8/2010 | Hillen et al. | |
| 7,809,534 B2 * | 10/2010 | Sturrock | G05B 17/02 700/37 |
| 8,049,139 B2 | 11/2011 | Houston | |
| 8,115,138 B2 | 2/2012 | Jacovetty et al. | |
| 8,224,881 B1 | 7/2012 | Spear | |
| 8,322,591 B2 | 12/2012 | Diez et al. | |
| 8,592,723 B2 | 11/2013 | Davidson et al. | |
| 8,884,177 B2 | 11/2014 | Daniel et al. | |
| 9,089,921 B2 | 7/2015 | Daniel et al. | |
| 9,104,195 B2 | 8/2015 | Daniel et al. | |
| 9,937,577 B2 | 4/2018 | Daniel et al. | |
| 2002/0117487 A1 | 8/2002 | Corby, Jr. et al. | |
| 2004/0122550 A1 | 6/2004 | Klimko et al. | |
| 2004/0232128 A1 | 11/2004 | Niedereder et al. | |
| 2004/0245227 A1 | 12/2004 | Grafton-Reed et al. | |
| 2005/0127052 A1 | 6/2005 | Spencer | |
| 2005/0149210 A1 | 7/2005 | Britton | |
| 2006/0070987 A1 | 4/2006 | Daniel | |
| 2006/0131291 A1 | 6/2006 | Kaufman | |
| 2006/0178778 A1 | 8/2006 | Fuhlbrigge et al. | |
| 2006/0207980 A1 | 9/2006 | Jacovetty et al. | |
| 2006/0231539 A1 * | 10/2006 | Katiyar | B23K 9/173 219/137 R |
| 2007/0056942 A1 | 3/2007 | Daniel | |
| 2007/0080153 A1 | 4/2007 | Albrecht | |
| 2007/0198105 A1 | 8/2007 | Britton | |
| 2007/0262065 A1 | 11/2007 | Peters et al. | |
| 2008/0149686 A1 | 6/2008 | Daniel et al. | |
| 2008/0158502 A1 | 7/2008 | Becker | |
| 2008/0169277 A1 | 7/2008 | Achtner et al. | |
| 2009/0094721 A1 | 4/2009 | Becker | |
| 2009/0107969 A1 | 4/2009 | Asai | |
| 2009/0173726 A1 * | 7/2009 | Davidson | B23K 9/0956 219/130.01 |
| 2009/0277893 A1 | 11/2009 | Spellman | |
| 2009/0298024 A1 | 12/2009 | Batzler | |
| 2009/0313549 A1 * | 12/2009 | Casner | B23K 9/0953 715/740 |
| 2010/0012625 A1 | 1/2010 | Silk et al. | |
| 2010/0062405 A1 * | 3/2010 | Zboray | G09B 19/24 434/234 |
| 2010/0176106 A1 * | 7/2010 | Christensen | B23K 37/0264 219/137 R |
| 2010/0217440 A1 | 8/2010 | Lindell | |
| 2010/0262468 A1 | 10/2010 | Blankenship | |
| 2011/0083241 A1 | 4/2011 | Cole | |
| 2011/0120978 A1 | 5/2011 | Takahashi et al. | |
| 2011/0172796 A1 | 7/2011 | Sohmshetty et al. | |
| 2011/0198329 A1 | 8/2011 | Davidson et al. | |
| 2011/0246395 A1 | 10/2011 | Dolson et al. | |
| 2011/0255259 A1 | 10/2011 | Weber | |
| 2011/0290765 A1 | 12/2011 | Albrecht et al. | |
| 2012/0095941 A1 | 4/2012 | Dolson et al. | |
| 2012/0122062 A1 | 5/2012 | Yang | |
| 2012/0145689 A1 | 6/2012 | Hillen | |
| 2012/0325792 A1 | 12/2012 | Stein et al. | |
| 2013/0008003 A1 | 1/2013 | Izutani et al. | |
| 2013/0015169 A1 | 1/2013 | Marschke et al. | |
| 2013/0075380 A1 | 3/2013 | Albrech et al. | |
| 2013/0119037 A1 | 5/2013 | Daniel | |
| 2013/0264319 A1 * | 10/2013 | Temby | B23K 9/095 219/130.1 |
| 2013/0277344 A1 * | 10/2013 | Guymon | B23K 5/18 219/125.1 |

(56) References Cited

U.S. PATENT DOCUMENTS

| | | | |
|---|---|---|---|
| 2013/0282182 | A1 | 10/2013 | Hideg |
| 2014/0021184 | A1 | 1/2014 | Daniel |
| 2014/0027422 | A1 | 1/2014 | Panelli |
| 2014/0042135 | A1 | 2/2014 | Daniel et al. |
| 2014/0042136 | A1 | 2/2014 | Daniel et al. |
| 2014/0042137 | A1 | 2/2014 | Daniel et al. |
| 2014/0263225 | A1 | 9/2014 | Daniel et al. |
| 2014/0263226 | A1 | 9/2014 | Daniel et al. |
| 2016/0361774 | A9 | 12/2016 | Daniel et al. |

FOREIGN PATENT DOCUMENTS

| | | | | |
|---|---|---|---|---|
| CN | 1469791 | A | 1/2004 | |
| CN | 101600532 | A | 12/2009 | |
| CN | 20219978 | U | 4/2012 | |
| CN | 102573720 | A | 7/2012 | |
| CN | 102596476 | A | 7/2012 | |
| CN | 105209994 | A | 12/2015 | |
| CN | 105229545 | | 1/2016 | |
| CN | 106270941 | A | 1/2017 | |
| EP | 1078707 | | 2/2001 | |
| EP | 1170649 | A1 | 1/2002 | |
| EP | 1700667 | | 9/2006 | |
| EP | 1750185 | | 2/2007 | |
| JP | 2010075954 | A | 4/2010 | |
| WO | 2002086656 | | 10/2002 | |
| WO | 2005084867 | | 9/2005 | |
| WO | 2007009131 | A1 | 1/2007 | |
| WO | 2008031052 | | 3/2008 | |
| WO | 2008079165 | A1 | 7/2008 | |
| WO | 2010142858 | | 12/2010 | |
| WO | WO 2010142858 | A1 * | 12/2010 | ........... B23K 9/0953 |
| WO | 2011058433 | A1 | 5/2011 | |
| WO | 2011100214 | A1 | 8/2011 | |
| WO | WO 2012004491 | A2 * | 1/2012 | ............ B23K 9/095 |
| WO | 2013160745 | A1 | 10/2013 | |
| WO | 2014140738 | A2 | 9/2014 | |
| WO | 2014140743 | A1 | 9/2014 | |
| WO | 2014140746 | A2 | 9/2014 | |
| WO | 2014140747 | A2 | 9/2014 | |
| WO | 2014140749 | A1 | 9/2014 | |
| WO | 2014140766 | A1 | 9/2014 | |

OTHER PUBLICATIONS

17—The Intelligent Welding Gun: Augmented Reality for Experimental Vehicle Construction; Florian Echtler, et al.; in: Virtual and Augmented Reality Applications in Manufacturing; Ong S.K and New A.Y.C.,eds. Springer Verlag 2003. 28 pgs.
PCT/IB2014/000313—International Search Report and Written Opinion of the International Searching Authority dated Sep. 10, 2014.
Office Action from Australian Patent Application No. 2007338858 dated Aug. 13, 2010 (2 pages).
Office Action from Canadian Patent Application No. 2672717 dated Mar. 21, 2013 (3 pages).
Office Action from Canadian Patent Application No. 2672717 dated Sep. 2, 2010 (5 pages).
Office Action from Chinese Patent Application No. 200780046777.X dated Jul. 3, 2012 (4 pages).
Office Action from Chinese Patent Application No. 200780046777.X dated Jul. 30, 2013 (4 pages).
Office Action from Chinese Patent Application No. 200780046777.X dated Feb. 1, 2013 (5 pages).
Office Action from Chinese Patent Application No. 200780046777.X dated Jan. 15, 2014 (5 pages).
Office Action from Chinese Patent Application No. 200780046777.X dated Aug. 14, 2014 (8 pages).
Office Action from Chinese Patent Application No. 200780046777.X dated Jul. 20, 2011 (8 pages).
IFW of (related by subject matter) U.S. Appl. No. 11/227,349, filed Sep. 15, 2015.

International Search Report and Written Opinion from PCT/US07/15014 dated Mar. 11, 2008.
International Preliminary Report on Patenability from PCT/US07/15014 dated Jun. 6, 2009.
International Search Report and Written Opinion from PCT/IB2014/000319 dated Aug. 29, 2014.
International Search Report and Written Opinion from PCT/IB2014/000323 dated Sep. 19, 2014.
International Search Report and Written Opinion from PCT/IB2014/000324 dated Sep. 8, 2014.
International Search Report and Written Opinion from PCT/IB2014/000326 dated Aug. 29, 2014.
Lincoln Welders NA-3 and NA-4, Automatic Welding Systems with Solid State Controls, brochure.
Power Feed 10M, Publication E8.266, Aug. 2004 brochure.
Power Wave 455 M & Power Wave 455 M/Sti, Publication E5.161, Aug. 2004, brochure.
NA-5 Automatic Wedling System, brochure.
Wave Designer, Software for Waveform Control Technology, brochure.
"Interim Guidance for Determining Subject Matter Eligibility for Process Claims in View of *Bilski* v. *Kappos*," 75 Fed. Reg. 43,922-43,928 (Jul. 27, 2010), 7 pages.
Echtler et al., "The Intelligent Welding Gun: Augmented Reality for Experimental Vehicle Construction;" in: Virtual and Augmented Reality Applications in Manufacturing; Ong. S.K and Nee A.Y.C. eds. Springer Verlag 2003. 28 pgs., Jan. 1, 2003.
Rubinovitz et al., Task Leevl Off-Line Programming System for Robotic Arc Welding—an Overview 8287 Journal of Manufacturing Systems, 7 (1988) No. 4, Dearborn, MI USA; pp. 293-305.
Office Action from U.S. Appl. No. 11/613,652 dated Aug. 21, 2008.
Amendment from from U.S. Appl. No. 11/613,652 dated Nov. 20, 2008.
Office Action from U.S. Appl. No. 11/613,652 dated Jun. 9, 2009.
Amendment from from U.S. Appl. No. 11/613,652 dated Sep. 9, 2009.
Office Action from U.S. Appl. No. 11/613,652 dated Jan. 25, 2010.
Amendment from U.S. Appl. No. 11/613,652 dated Jun. 11, 2010.
Office Action from U.S. Appl. No. 11/613,652 dated Aug. 17, 2011.
Amendment from U.S. Appl. No. 11/613,652 dated Dec. 19, 2011.
Office Action from U.S. Appl. No. 11/613,652 dated Feb. 20, 2014.
Amendment from U.S. Appl. No. 11/613,652 dated May 19, 2014.
Advisory Action from U.S. Appl. No. 11/613,652 dated Jun. 6, 2014.
Notice of Appeal from U.S. Appl. No. 11/613,652 dated Aug. 19, 2014.
Applicant Summary of Interview With Examiner from U.S. Appl. No. 11/613,652 dated Aug. 19, 2014.
Applicant Summary of Interview With Examiner from U.S. Appl. No. 11/613,652 dated Oct. 2, 2014.
Applicant Initiated Interview Summary from U.S. Appl. No. 11/613,652 dated Oct. 9, 2014.
Amendment from U.S. Appl. No. 11/613,652 dated Oct. 27, 2014.
Notice of Allowance from U.S. Appl. No. 11/613,652 dated Nov. 20, 2014.
Restriction Requirement from U.S. Appl. No. 13/802,918 dated Jan. 14, 2016.
Restriction Requirement from U.S. Appl. No. 13/802,883 dated Jan. 14, 2016.
Office Action from U.S. Appl. No. 13/802,951 dated Nov. 2, 2015.
Amendment from U.S. Appl. No. 13/802,951 dated Mar. 2, 2016.
Restriction Requirement from U.S. Appl. No. 13/802,985 dated Jan. 15, 2016.
Restriction Requirement from U.S. Appl. No. 13/803,077 dated Jan. 14, 2016.
Response to Restriction Requirement from U.S. Appl. No. 13/802,918 dated Mar. 11, 2016.
Response to Restriction Requirement from U.S. Appl. No. 13/803,077 dated Mar. 11, 2016.
Office Action from U.S. Appl. No. 13/802,918 dated Dec. 16, 2016.
Amendment from U.S. Appl. No. 13/803,077 dated Dec. 29, 2016.
Advisory Action from U.S. Appl. No. 13/803,077 dated Jan. 27, 2017.

(56) References Cited

OTHER PUBLICATIONS

Amendment from U.S. Appl. No. 13/803,077 dated Jan. 30, 2017.
Applicant Initiated Interview Summary from U.S. Appl. No. 13/802,985.
Amendment from U.S. Appl. No. 13/802,985 dated Oct. 26, 2016.
Final Office Action from U.S. Appl. No. 13/803,077 dated Sep. 29, 2016.
Applicant Initiated Interview Summary from U.S. Appl. No. 13/802,883 dated Oct. 17, 2016.
Amendment from U.S. Appl. No. 13/802,883 dated Oct. 26 2016.
Response to Restriction Requirement from U.S. Appl. No. 13/802,985 dated Mar. 11, 2016.
Notice of Non-Compliant Amendment from U.S. Appl. No. 13/802,985 dated Apr. 13, 2016.
Amendment from U.S. Appl. No. 13/802,985 dated Jun. 2, 2016.
Office Action from U.S. Appl. No. 13/802,985 dated Jul. 26, 2016.
Office Action from U.S. Appl. No. 13/803,077 dated Apr. 21, 2016.
Response to Office Action from U.S. Appl. No. 13/803,077 dated Jul. 14, 2016.
Response to Restriction Requirement from U.S. Appl. No. 13/802,883 dated Mar. 11, 2016.
Office Action from U.S. Appl. No. 13/802,883 dated Jul. 28, 2016.
International Preliminary Report on Patenability from PCT/US15/001991 dated May 26, 2017.
Response to Office Action from U.S. Appl. No. 13/802,985 dated Jun. 8, 2017.
Advisory Action from U.S. Appl. No. 13/803,077 dated Jun. 15, 2017.
Amendment from U.S. Appl. No. 13/803,077 dated Jun. 20, 2017.
Office Action from U.S. Appl. No. 13/803,077 dated Aug. 7, 2017.
Response to Final Office Action from U.S. Appl. No. 13/802,883 dated Jun. 8, 2017.
Office Action from Chinese Application No. 201480026559.X dated Apr. 27, 2017 (English Translation).
Office Action from Chinese Patent Application No. 201480026618.3 dated Mar. 17, 2017 (English translation not available).
Office Action from Chinese Patent Application No. 201480027935 dated Mar. 23, 2017.
Office Action from Chinese Application No. 201480027966.2 dated Mar. 1, 2017.
Office Action from U.S. Appl. No. 13/802,985 dated Feb. 8, 2017.
Final Office Action from U.S. Appl. No. 13/802,883 dated Feb. 8, 2017.
Response to Office Action from U.S. Appl. No. 13/802,918 dated May 9, 2017.
Final Office Action from U.S. Appl. No. 13/803,077 dated Feb. 23, 2017.
Amendment After Final Office Action from U.S. Appl. No. 13/803,077 dated May 22, 2017.
Office Action from Chinese Application No. 201480027966.2 dated Aug. 28, 2017.
Office Action from Chinese Application No. 201610806381.1 dated Aug. 1, 2017 (English Translation).
Final Office Action from U.S. Appl. No. 13/802,918 dated Sep. 8, 2017.
Non-Final Office Action from U.S. Appl. No. 13/802,883 dated Aug. 24, 2017.
Advisory Action from U.S. Appl. No. 13/802,985 dated Jun. 29, 2017.
Amendment from U.S. Appl. No. 13/802,985 dated Jul. 6, 2017.
Office Action from U.S. Appl. No. 14/730,991 dated Sep. 26, 2017.
Office Action from U.S. Appl. No. 13/802,985 dated Nov. 3, 2017.
Amendment from U.S. Appl. No. 13/802,918 dated Mar. 8, 2018.
Advisory Action from U.S. Appl. No. 13/802,918 dated Mar. 13, 2018.
Office Action from Chinese Application No. 201480049376.X dated Jan. 2, 2018.
Amendment from U.S. Appl. No. 14/730,991 dated Jan. 26, 2018.
Amendment from U.S. Appl. No. 13/803,077 dated Dec. 6, 2017.
Applicant Initiated Interview Summary from U.S. Appl. No. 13/803,077 dated Dec. 15, 2017.
Second Office Action from Chinese Application No. 201480027580.1 dated Jan. 3, 2018 (English Translation).
International Search Report and Written Opinion from PCT/IB2014/000350 dated Sep. 4, 2014.
International Preliminary Report on Patentability from PCT/IB2014/000350 dated Sep. 15, 2015.
Notice of Allowance from U.S. Appl. No. 13/802,951 dated Dec. 7, 2017.
Amendment from U.S. Appl. No. 13/802,985 dated May 2, 2018.
Applicant Initiated Interview Summary from U.S. Appl. No. 13/802,985 dated May 3, 2018.
Response to Office Action from U.S. Appl. No. 13/802,883 dated Jan. 24, 2018.
Office Action from Chinese Patent Application No. 201480026618.3 dated Jun. 27, 2018.
Office Action from U.S. Appl. No. 13/803,077 dated May 15, 2018.
Office Action from U.S. Appl. No. 13/802,883 dated Jun. 29, 2018.
Office Action from U.S. Appl. No. 14/730,991 dated May 24, 2018.
Office Action from Chinese Patent Application No. 201480027935.7 dated May 11, 2018.
Final Office Action from U.S. Appl. No. 13/803,032 dated Oct. 5, 2017.
Office Action from Chinese Application No. 201480027966.2 dated Mar. 8, 2018 (5 pages).
Supplemental Response from U.S. Appl. No. 13/802,918 dated Aug. 29, 2018.
Office Action from U.S. Appl. No. 13/802,918 dated Sep. 7, 2018.
Amendment from U.S. Appl. No. 13/802,918 dated Dec. 7, 2018.
Applicant Initiated Interview Summary U.S. Appl. No. 13/802,883 dated Sep. 25, 2018.
Response to Office Action from U.S. Appl. No. 13/802,883 dated Sep. 26, 2018.
Office Action from U.S. Appl. No. 13/802,985 dated Sep. 20, 2018.
Amendment from U.S. Appl. No. 13/802,985 dated Dec. 19, 2018.
Applicant Initiated Interview Summary from U.S. Appl. No. 13/802,985 dated Dec. 31, 2018.
Response to Office Action from U.S. Appl. No. 13/803,077 dated Aug. 15, 2018.
Advisory Action, Applicant Initiated Interview Summary and After Final Consideration Program Decision from U.S. Appl. No. 13/803,077 dated Sep. 17, 2018.
Applicant Statement of Substance of Interview from U.S. Appl. No. 13/803,077 dated Oct. 17, 2018.
Amendment from U.S. Appl. No. 14/730,991 dated Aug. 21, 2018.
Advisory Action from U.S. Appl. No. 14/730,991 dated Sep. 27, 2018.
Notice of Appeal from U.S. Appl. No. 14/730,991 dated Oct. 23, 2018.
Preliminary Amendment from U.S. Appl. No. 16/131,827 dated Dec. 4, 2018.
Office Action from Korean Application No. 10-2014-7030446 with English Translation dated Nov. 29, 2018.
Office Action from Chinese Patent Application No. 201480026618.3 dated Jan. 7, 2019 (English Summary).
Decision on Rejection from Chinese Patent Application No. 201480027935.7 dated Dec. 28, 2018 (English Summary).
Fourth Office Action from Chinese Application No. 201480027580.1 dated Apr. 15, 2019.
Office Action from Chinese Application No. 201480026654.X dated May 28, 2018 (English Summary).
Office Action from U.S. Appl. No. 13/802,883 dated Feb. 8, 2019.
Office Action from U.S. Appl. No. 13/802,985 dated Apr. 1, 2019.
Office Action from U.S. Appl. No. 13/802,918 dated Mar. 20, 2019.
Appeal Brief from U.S. Appl. No. 14/730,991 dated Dec. 21, 2018.
Notice of Allowance with Examiner Initiated Interview Summary from U.S. Appl. No. 14/730,991 dated Apr. 4, 2019.
Appeal Brief from U.S. Appl. No. 13/802,883 dated Jul. 8, 2019.
Amendment from U.S. Appl. No. 13/802,918 dated Jun. 19, 2019.
Notice of Appeal from U.S. Appl. No. 13/802,918 dated Jun. 20, 2019.
Appeal Brief from U.S. Appl. No. 13/802,918 dated Aug. 20, 2019.
Notice of Allowance from U.S. Appl. No. 14/730,991 dated Jul. 10, 2019.

(56) References Cited

OTHER PUBLICATIONS

Board of Appeal Decision from U.S. Appl. No. 13/802,883 dated Aug. 27, 2020.
Response to Office Action from U.S. Appl. No. 13/802,918 dated Sep. 11, 2020.
Office Action from U.S. Appl. No. 15/948,357 dated Jul. 28, 2020.
Amendment from U.S. Appl. No. 15/948,357 dated Oct. 20, 2020.
First Office Action from Chinese Application No. 201910567340.5 dated Sep. 30, 2020 with English Translation.
Notice of Allowance from U.S. Appl. No. 15/948,357 dated Nov. 2, 2020.
Office Action from U.S. Appl. No. 16/131,827 dated Nov. 16, 2020.
Notice of Allowance from U.S. Appl. No. 13/802,918 dated Dec. 18, 2020.
Notice of Allowance from U.S. Appl. No. 13/802,883 dated Dec. 16, 2020.
Office Action from U.S. Appl. No. 16/131,827 dated Apr. 29, 2021.

\* cited by examiner

SYSTEM AND METHOD OF EXPORTING OR USING WELDING SEQUENCER DATA FOR EXTERNAL SYSTEMS

CROSS-REFERENCE TO RELATED APPLICATIONS

This application is a continuation-in-part of U.S. application Ser. No. 11/613,652, filed Dec. 20, 2006, and entitled "WELDING JOB SEQUENCER." The entirety of the aforementioned application is incorporated herein by reference.

TECHNICAL FIELD

Devices, systems, and methods consistent with the invention relate to welding work cells.

BACKGROUND OF THE INVENTION

In the related art, work cells are used to produce welds or welded parts. There are at least two broad categories of work cells, including robotic work cells and semi-automatic work cells.

In robotic work cells, the scheduling and performing of welding operations is largely automated, with little operator involvement. Thus, these cells generally have a relatively low labor cost and a relatively high productivity. However, their repeating operations cannot easily adapt to varying welding conditions and/or sequences.

In contrast, semi-automatic work cells (i.e., work cells involving at least some operator welding) generally provide less automation vis-à-vis robotic work cells, and accordingly have a relatively higher labor cost and a relatively lower productivity. Nevertheless, there are many instances where using a semi-automatic welding work cell can actually be advantageous over robotic work cells. For example, a semi-automatic welding work cell can more easily adapt to varying welding conditions and/or sequences.

Unfortunately, when welding more complex assemblies in related art semi-automatic work cells, multiple different welding schedules are often required for different types of welds on different parts of an assembly. In many systems, when a different welding schedule must be utilized, the operator is required to stop welding operations and manually adjust the output of the semi-automatic equipment according to the new schedule. In some other systems, this manual adjustment is eliminated by storing particular schedules in the work cell. Nevertheless, even in such systems, the operator still needs to cease welding operations and push a button to select the new welding schedule before he may continue welding.

Neither of these practices for setting a different welding schedule is particularly efficient. Thus, in practice, the number of welding schedules used in a semi-automatic work cell is often reduced in order to eliminate the need for constant adjustment of the output of the semi-automatic equipment. While this reduction of welding schedules makes the overall operation easier for the welder, the forced simplification of this approach can lead to reduced productivity and lower overall quality.

Additionally, when abiding by strict quality control specifications, it is sometimes necessary to perform welds in a specific sequence, verify that each weld is performed with a given set of conditions, and monitor the output of the equipment during the welding operations. In a robotic work cell, these requirements are easily fulfilled. However, in a semi-automatic work cell, these requirements are susceptible to human error, since the operator must keep track of all of these aspects in addition to performing the welding operations themselves.

An illustrative example of the above problems is shown in the related art semi-automatic welding method diagrammatically represented in FIG. 1. In this method, each of the various scheduling, sequencing, inspection and welding operations are organized and performed by the operator (i.e., the welder) himself. Specifically, the operator begins the welding job at operation 10. Then, the operator sets up the welding equipment according to schedule A, at operation 20. Next, the operator performs weld #1, weld #2, and weld #3 using welding schedule A at operations 22, 24 and 26. Then, the operator stops welding operations and sets up the welding equipment according to schedule B at operation 30. Next, the operator performs weld #4 using welding schedule B at operation 32. Then, the operator checks the dimensions of the assembly at operation 40, and sets up the welding equipment according to schedule C at operation 50. Next, the operator performs weld #5 and weld #6 using welding schedule C at operations 52 and 54. After the welding operations are completed, the operator visually inspects the welded assembly at operation 60, and completes the welding job at operation 70.

Clearly, the method shown in FIG. 1 depends on the operator to correctly follow the predefined sequencing for performing welds and inspections, to accurately change between welding schedules (such as at operation 30), and to perform the welding itself. Errors in any of these responsibilities can result either in rework (if the errors are caught during inspection at operation 60) or a defective part being supplied to the end user. Further, this exemplary semi-automatic welding method hampers productivity, because the operator must spend time configuring and reconfiguring weld schedules.

The above problems demand an improvement in the related art system.

SUMMARY OF THE INVENTION

In accordance with an embodiment of the present invention, a welding system is provided that includes a welding job sequencer component that is configured to identify a welding sequence for a welding work cell, wherein the welding sequence defines at least a parameter and a welding schedule for a first welding procedure to create a first weld on a workpiece and a second welding procedure to create a second weld on the workpiece. The welding job sequencer component is further configured to utilize the welding sequence in the welding work cell to automatically configure welding equipment to perform the first welding procedure and the second welding procedure on the workpiece without intervention from the operator. In the embodiment, the welder system further includes a collection component that is configured to collect a real time welding parameter for at least one of the first weld or the second weld, wherein the collection component corresponds the real time welding parameter to the identified welding sequence and at least one of the first weld or the second weld.

In accordance with an embodiment of the present invention, a method of welding in a welding work cell with a welding sequence is provided that includes at least the steps of: identifying a welding sequence for an operator to use in a welding work cell, wherein the welding sequence defines a first welding procedure that includes a first parameter to create a first weld on a workpiece and a second welding procedure that includes a second parameter to create a second weld on the workpiece; utilizing the welding sequence to automatically modify a welding equipment within the welding work cell without intervention from the operator creating at least one of the first weld or the second weld; collecting a welding parameter in real time during creation of at least one of the first weld or the second weld; associating the welding parameter to the welding sequence and at least one of the first weld or the second weld; generating a welding parameter model based on one or more welding parameters collected in real time; and implementing the welding parameter model for the welding sequence performed after at least one of the first weld or the second weld.

In accordance with an embodiment of the present invention, a welding system is provided that includes at least the following: means for identifying a welding sequence for an operator to use in a welding work cell, wherein the welding sequence defines a first welding procedure that includes a first parameter to create a first weld on a workpiece and a second welding procedure that includes a second parameter to create a second weld on the workpiece; means for utilizing the welding sequence to automatically modify a welding equipment within the welding work cell without intervention from the operator creating at least one of the first weld or the second weld; means for collecting a welding parameter in real time during creation of at least one of the first weld or the second weld; means for associating the welding parameter to the welding sequence and at least one of the first weld or the second weld; means for generating a welding parameter model based on one or more welding parameters collected in real time; and means for implementing the welding parameter model for the welding sequence performed after at least one of the first weld or the second weld.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to methods and systems that relate to collecting one or more welding parameters in real time during creation of one or more welds using a welding sequence. The one or more welding parameters can be associated with a particular welding sequence. Moreover, based on the one or more welding parameters collected, a modeled welding parameter can be generated to increase quality, efficiency, and the like. A collection component collects real time welding parameter data from which a quality manager component creates a modeled welding parameter. The modeled welding parameter can be employed for the welding sequence to monitor or track the welding parameter during a subsequent weld.

According to an aspect of the invention, there is provided a semi-automatic welding work cell including a welding job sequencer that automatically selects a welding schedule for use by an operator in the semi-automatic welding work cell.

According to another aspect of the invention, there is provided a method of welding in a semi-automatic work cell, including automatically selecting a welding schedule for use by an operator in the semi-automatic welding work cell.

According to another aspect of the invention, there is provided a welding production line including at least one semi-automatic welding work cell, where the semi-automatic work cell includes a welding job sequencer that automatically selects a welding schedule for use by an operator therein.

According to another aspect of the invention, there is provided a method of monitoring a welding production line, including automatically selecting a welding schedule for use by an operator in a semi-automatic welding work cell.

The term "component" as used herein can be defined as a portion of hardware, a portion of software, or a combination thereof. A portion of hardware can include at least a processor and a portion of memory, wherein the memory includes an instruction to execute.

Figure 1:
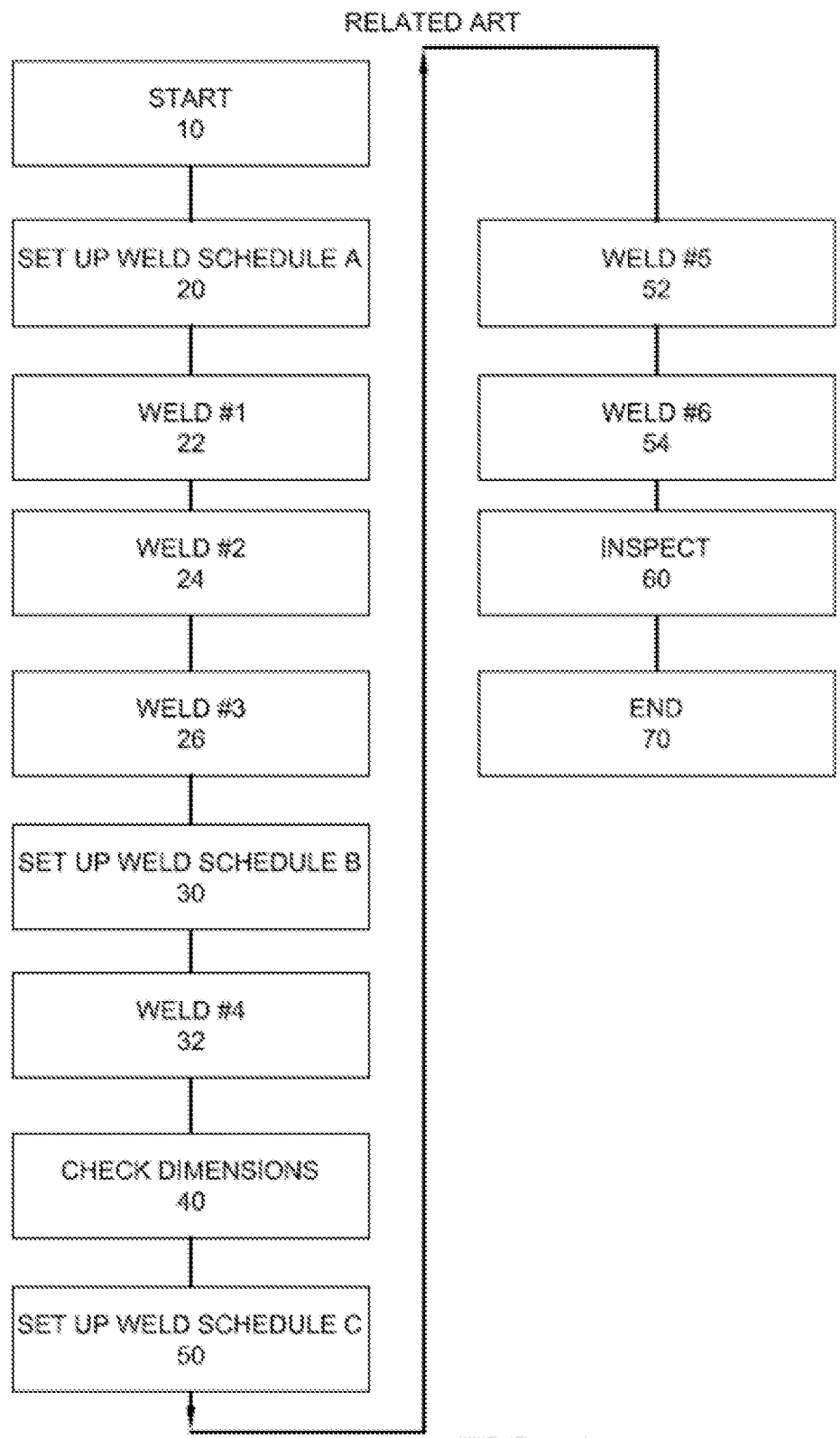
FIG. 1 illustrates a welding operation of the related art utilizing a semi-automatic welding work cell.
Figure 2:
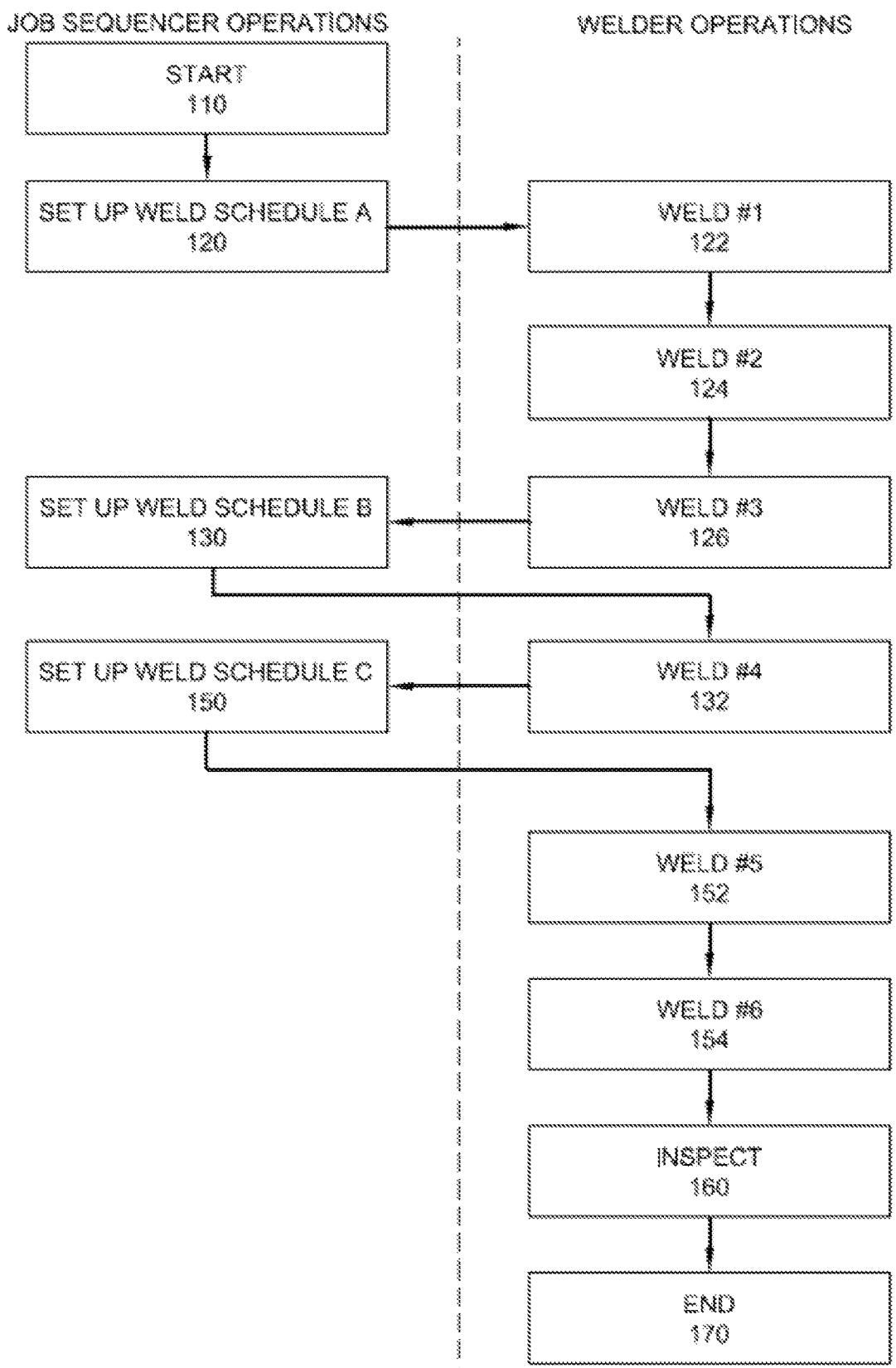
FIG. 2 illustrates a welding operation according to the invention utilizing a semi-automatic welding work cell.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIG. 2 is referenced. In an exemplary embodiment of the invention as illustrated in FIG. 2, a welding job sequencer is provided. The welding job sequencer improves the semi-automatic work cell of the related art by increasing the productivity of the semi-automatic work cell without compromising the number of weld schedules usable therein. The welding job sequencer accomplishes this improvement by implementing automatic changes in the semi-automatic work cell, and by providing the operator with an array of commands and instructions.

More specifically, in an exemplary embodiment, the welding job sequencer automatically selects and implements a function of the welding work cell. An example of such a function includes a particular weld schedule to be used with the semi-automatic work cell. In other words, the welding job sequencer may select a weld schedule to be used for a particular weld, and modify the settings of the semi-automatic work cell in accordance with the selected weld schedule, automatically for the operator (i.e., without the operator's specific intervention).

Additionally, in the exemplary embodiment, the welding job sequencer may automatically indicate a sequence of operations that the operator should follow to create a final welded assembly. In conjunction with the automatic selection of welding schedules, this indicated sequence allows an operator to follow the sequence to create a final welded part, without having to spend time adjusting, selecting, or reviewing each individual weld schedule and/or sequence.

Accordingly, since the welding job sequencer sets up the welding equipment and organizes the workflow, and since the operator only performs the welding operations themselves, the chance for error in the welding operation is greatly reduced, and productivity and quality are improved.

The exemplary embodiment is diagrammatically represented in FIG. 2. In FIG. 2, at operation 110, the welding job sequencer begins operation, and immediately sets the welding equipment to use weld schedule A (operation 120) and instructs the operator to perform welds #1, #2 and #3. Then, the operator performs welds #1, #2 and #3 using weld schedule A (operations 122, 124 and 126). Next, the welding job sequencer sets the welding equipment to use weld schedule B (operation 130), and instructs the operator to perform weld #4. Then the operator performs weld #4 using weld schedule B (operations 132). After completion of weld schedule B, the welding job sequencer sets the welding equipment to use weld schedule C (operation 150), and instructs the operator to perform welds #5 and #6, and to inspect the part. Then, the operator performs welds #5 and #6 (operations 152, and 154) using weld schedule C, and inspects the completed part to confirm that it is correct (operation 160). This inspection may include dimensional verification, visual defect confirmation, or any other type of check that might be needed. Further, operation 160 may include a requirement that the operator affirmatively indicate that the inspection is complete, such as by pressing an "OK" button, before it is possible to proceed to the next operation. Lastly, the welding job sequencer indicates that the welding operation is at an end (operation 170), and re-sets for the next operation.

Accordingly, as noted above, the sequencing and scheduling of welding operations is completed by the sequencer, and frees the operator to focus on performing welds according to instruction.

The welding job sequencer may select and implement a new function, such as the selection and implementation of weld schedules A, B and C shown in FIG. 2, based upon various variables or inputs. For example, the welding job sequencer may simply select new weld schedules based upon a monitoring of elapsed time since the beginning of the welding operations, or since the cessation of welding (such as the time after weld #3 in FIG. 2 above). Alternatively, the welding job sequencer may monitor the actions of the operator, compare the actions to the identified sequence of welds, and select new weld schedules appropriately. Still further, various combinations of these methods, or any other effective method, may be implemented, as long as the end effect is to provide an automatic selection and implementation of a function, such as the weld schedule, for use by the operator.

Parameters of the selected weld schedule may include such variables as welding process, wire type, wire size, WFS, volts, trim, which wire feeder to use, or which feed head to use, but are not limited thereto.

While the above description focuses on the selection of a weld schedule as a function which is automatically selected and implemented, the welding job sequencer is not limited to using only this function.

For example, another possible function that may be selected and implemented by the welding job sequencer is a selection of one of multiple wire feeders on a single power source in accordance with the weld schedule. This function provides an even greater variability in welding jobs capable of being performed by the operator in the semi-automatic work cell, since different wire feeders can provide a great variance of, for example, wire sizes and types.

Another example of a function compatible with the welding job sequencer is a Quality Check function. This function performs a quality check of the weld (either during welding or after the weld is completed) before allowing the job sequence to continue. The quality check can monitor various welding parameters and can pause the welding operation and alert the operator if an abnormality is detected. An example of a welding parameter measurable by this function would be arc data.

Another example of such a function would be a Repeat function. This function would instruct the operator to repeat a particular weld or weld sequence. An example of the use of this function includes when the Quality Check function shows an abnormality, or when multiple instances of the same weld are required.

Another example of such a function would be a Notify Welder function, which communicates information to the welder. This function would display information, give an audible signal, or communicate with the welder by some other means. Examples of use of this function include an indication to the operator that he is free to begin welding, or an indication that the operator should check some portion of the welded part for quality purposes.

Another example of such a function would be a Enter Job Information function. This function will require the welder to enter information, such as the part serial number, a personal ID number, or other special conditions before the job sequencer can continue. This information could also be read from a part or inventory tag itself through Radio Frequency Identification (RFID), bar code scanning, or the like. The welding job sequencer could then utilize the entered information for the welding operations. An example of the use of this function would be as a predicate to the entire welding operation, so as to indicate to the welding job sequencer which schedules and/or sequences should be selected.

A further example of such a function would be a Job Report function. This function will create a report on the welding job, which could include information such as: the number of welds performed, total and individual arc timing, sequence interruptions, errors, faults, wire usage, arc data, and the like. An example of the use of this function would be to report to a manufacturing quality department on the efficiency and quality of the welding processes.

A still further example of such a function would be a System Check function. This function will establish whether the welding job can continue, and could monitor such parameters as: wire supply, gas supply, time left in the shift (as compared to the required time to finish the job), and the like. The function could then determine whether the parameters indicate that there is enough time and/or material for the welding job to continue. This function would prevent down-time due to material depletion, and would prevent work-in-process assemblies from being delayed, which can lead to quality problems due to thermal and scheduling issues.

Further, as mentioned above, the welding job sequencer may select and implement a new function, based upon various variables or inputs. These variables and inputs are not particularly limited, and can even be another function. For example, another function compatible with the welding job sequencer is a Perform Welding Operation function. This function is designed to detect the actual welding performed by the operator, and to report that welding so that the welding job sequencer can determine whether to proceed with further operations. For example, this function can operate by starting when the operator pulls the trigger to start the welding operation, and finishing when the operator releases the trigger after the welding is complete, or after a predetermined period of time after it starts. This function could end when the trigger is released or it could be configured to automatically turn off after a period of time, a quantity of wire, or an amount of energy is delivered. This function may be used to determine when to select a new function, such as a new weld schedule, as discussed above.

Still further, various semi-automatic and/or robotic work cells can be integrated together on a single network, and the sequencing of welding steps at a single work-cell can be fully integrated into a complete production schedule, which itself can be modified as needed to track variations in the production schedule. Sequencing and/or scheduling information can also be stored in a database, be stored by date as archival information, and be accessed to provide various production reports In an embodiment, a semi-automatic welding work cell for welding an assembly defined by a plurality of welds can be provided, the plurality of welds being defined by at least two weld schedules can include welding equipment for use by a welding operator to perform said plurality of welds and complete the assembly with said welding equipment having a plurality of functions. In the embodiment, the work cell can include a welding job sequencer that automatically selects a welding schedule for use by an operator in the semi-automatic welding work cell. In the embodiment, the welding job sequencer can select the welding schedule according to an elapsed time. In an embodiment, the welding job sequencer can detect when the operator is conducting a welding operation, and selects the welding schedule based upon that detection. In the embodiment, the welding job sequencer can detect when the operator is conducting a welding operation, and the welding job sequencer selects the welding schedule according to an amount of welding wire supplied for the welding operation. In the embodiment, the welding job sequencer can detect when the operator is conducting a welding operation, and the welding job sequencer selects the welding schedule according to an amount of energy supplied for the welding operation. In the embodiment, the welding schedule includes information about at least one of a welding process, wire type, wire size, WFS, volts, trim, wire feeder to use, or feed head to use.

In an embodiment, the welding work cell can include the welding job sequencer which select and implements at least one of a plurality of functions to define at least a first weld schedule and a second weld schedule from the at least two weld schedules so as to organize a workflow for creating the welded assembly and indicate to the welding operator a sequence of working operations for completing the assembly. In the embodiment, the welding job sequencer can automatically modify the welding equipment in accordance with the workflow and sequence of the welding operations without the welding operator intervening.

In the embodiment, the second weld schedule is defined according to an elapsed time of the first weld schedule. In the embodiment, the at least one function detects completion of said first weld schedule by said operator and automatically changes from said first weld schedule to said second weld schedule. In the embodiment, at least one function detects when the operator is conducting said first weld schedule, and said second weld schedule is defined according to an amount of welding wire supplied for said first weld schedule. In the embodiment, at least one function detects when the operator is conducting said first weld schedule, and said second weld schedule is defined according to an amount of energy supplied for said first weld schedule. In the embodiment, the at least one first weld set up parameter and said at least one second weld set up parameter comprise at least one of a welding process, wire type, wire size, WFS, volts, trim, wire feeder to use, or feed head to use. In the embodiment, at least one first weld set up parameter and said at least one second weld set up parameter comprise a feeder for use by an operator in the semi-automatic welding work cell. In the embodiment, at least one function monitors quality measurables of said weld assembly, wherein the quality measureables comprise at least information about an arc used to form the weld created by the operator In the embodiment, at least one function indicates information to the operator in the semiautomatic welding work cell. In the embodiment, at least one function accepts job information comprising at least a part ID number, operator ID number, or welding instructions. In the embodiment, at least one function produces a job report comprising at least one of a number of welds preformed, total arc time, individual arc time, sequence interruptions, errors, faults, wire usage, arc data. In the embodiment, at least one function includes a system check of said cell, the system check comprising at least a detection of wire supply, gas supply, and time.

In the embodiment, the welding job sequencer can select a welding sequence for use by the operator in the semi-automatic welding work cell. In the embodiment, the welding job sequencer can indicate the selected welding sequence to the operator in the semi-automatic welding work cell. In the embodiment, the welding job sequencer can select a wire feeder for use by an operator in the semi-automatic welding work cell. In the embodiment, the welding job sequencer can monitor quality measurables of a weld created by the operator, wherein the quality measureables comprise at least information about an arc used to form the weld created by the operator. In the embodiment, the welding job sequencer can indicate information to the operator in the semi-automatic welding work cell. In the embodiment, the welding job sequencer can accept job information comprising at least a part ID number, operator ID number, or welding instructions. In the embodiment, the welding job sequencer can produce a job report comprising at least one of a number of welds preformed, total arc time, individual arc time, sequence interruptions, errors, faults, wire usage, arc data. In the embodiment, the welding job sequencer can perform a system check comprising at least a detection of wire supply, gas supply, and time.

In an embodiment, a method of welding in a semi-automatic work cell can be provided that includes automatically selecting a welding schedule for use by an operator in the semi-automatic welding work cell. In the embodiment, the automatic selection can be performed after an elapsed time. In the embodiment, the method can include detecting when the operator is conducting a welding operation, wherein the automatic selection is performed based upon that detection. In the embodiment, the method can include detecting when the operator is conducting a welding operation, wherein the automatic selection is performed according to an amount of welding wire supplied for the welding operation. In the embodiment, the method can include detecting when the operator is conducting a welding operation, wherein the automatic selection is performed according to an amount of energy supplied for the welding operation. In the embodiment, the welding schedule can include information about at least one of a welding process, wire type, wire size, WFS, volts, trim, wire feeder to use, or feed head to use.

In the embodiment, the method can include selecting a welding sequence for use by the operator in the semi-automatic welding work cell. In the embodiment, the method can include indicating the selected welding sequence to the operator in the semi-automatic welding work cell. In the embodiment, the method can include selecting a wire feeder for use by an operator in the semi-automatic welding work cell. In the embodiment, the method can include monitoring quality measurables of a weld created by the operator, wherein the quality measureables comprise at least information about an arc used to form the weld created by the operator. In the embodiment, the method can include indicating information to the operator in the semi-automatic welding work cell. In the embodiment, the method can include accepting job information comprising at least a part ID number, operator ID number, or welding instructions. In the embodiment, the method can include producing a job report comprising at least one of a number of welds performed, total arc time, individual arc time, sequence interruptions, errors, faults, wire usage, arc data. In the embodiment, the method can include performing a system check comprising at least a detection of wire supply, gas supply, and time.

In an embodiment, a welding production line is provided with at least one semi-automatic welding work cell, wherein the semi-automatic work cell that includes a welding job sequencer that automatically selects a welding schedule for use by an operator therein. In the embodiment, the welding production line includes a monitoring system that communicates with the welding job sequencer to direct the welding job sequencer to automatically select the welding schedule for use by the operator therein.

In an embodiment, a method of monitoring a welding production line is provided that includes automatically selecting a welding schedule for use by an operator in a semi-automatic welding work cell. In the embodiment, the method can include directing the welding job sequencer to automatically select the welding schedule for use by the operator therein.

In an embodiment, a semi-automatic welding work cell is provided that includes a welding job sequencer that automatically selects a welding schedule for use by an operator in the semi-automatic welding work cell. The automatic selection may be by way of elapsed time, a detection of welding operations, a detection of the amount of welding wire supplied for the welding operation, or a detection of the amount of energy supplied for the welding operation.

In an embodiment, a method of welding in a semi-automatic work cell having welding equipment and a welding job sequencer to complete an assembly defined by a plurality of welds can be provided in which the plurality of welds can be defined by at least two weld schedules. The embodiment can include at least the steps of the following: implementing a welding equipment function with the welding job sequencer to define from the at least two weld schedules a first weld schedule having at least one first weld set up parameter and at least one first weld instruction and a second weld schedule having at least one second weld set up parameter and at least one second weld instruction, at least one of the said second weld set up parameter and said second weld instruction is different from said first weld set up parameter and said first weld instruction; indicating to a welding operator a sequence of welding operations for completing the assembly based on said first and second weld schedules; and automatically modifying said welding equipment in accordance with said sequence of welding operations for completing the assembly based on said first and second weld schedules.

In the embodiment, the method can include defining said second weld schedule is performed after an elapsed time defined by said first weld schedule. In the embodiment, the method can include detecting when the operator is conducting said first weld schedule, wherein defining said second schedule is based upon that detection. In the embodiment, defining said first and second weld schedules can include defining an amount of welding wire supplied for the welding operation. In the embodiment, defining said second weld schedule is according to an amount of energy supplied for the welding operation for said first weld schedule. In the embodiment, defining at least one of the first and second weld schedules can include selecting at least one of a welding process, wire type, wire size, WFS, volts, trim, wire feeder to use, or feed bead to use. In an embodiment, defining at least one of the first and second weld schedules can include selecting a wire feeder for use by an operator in the semi-automatic welding work cell. In an embodiment, the method can include monitoring quality measurables of a weld created by the operator, wherein the quality measureables comprise at least information about an arc used to form the weld created by the operator. In an embodiment, the method can include indicating information to the operator in the semi-automatic welding work cell. In an embodiment, the method can include accepting job information comprising at least a part ID number, operator ID number, or welding instructions. In an embodiment, the method can include producing a job report comprising at least one of a number of welds performed, total arc time, individual arc time, sequence interruptions, errors, faults, wire usage, arc data performing a system check comprising at least a detection of wire supply, gas supply, and time.

In an embodiment, a welding production line is provided that includes at least one semi-automatic welding work cell for welding an assembly defined by a plurality of welds, the plurality of welds being defined by at least weld schedules, the semi-automatic welding work cell including welding equipment for use by a welding operator to perform the plurality of welds and complete the assembly, the welding equipment having a plurality of functions. In the embodiment, the production line can include a welding job sequencer which selects and implements at least one of the plurality of functions to define at least a first and a second weld schedule in a sequence of welding operations from the at least two weld schedules to be used by said welding operator for completing the weld assembly. In an embodiment, the production line can include said first weld schedule contains at least one first weld set up parameter and at least one first weld instruction for said welding operator and said second weld schedule contains at least one second weld set up parameter and at least one second weld instruction for said welding operator, at least one of said first weld set up parameter and said first weld instruction is different from said second weld set up parameter and said second weld instruction, said welding job sequencer automatically modifying said welding equipment in accordance with said sequence of operations without said welding operator intervention. In an embodiment, the production line can include a monitoring system in communication with the welding job sequencer to monitor completion of the at least one weld instruction of each of the first and second weld schedule.

In an embodiment, a method for monitoring a welding production line in at least one semi-automatic welding work cell for use by a welding operator to complete an assembly defined by a plurality of welds, the plurality of welds being defined by at least two weld schedules, the semi-automatic welding work cell including welding equipment and a welding job sequencer. The method can include at least the following steps: defining at least a first and a second weld schedule in a sequence of welding operations from the at least two weld schedules with the welding job sequencer said first weld schedule having at least one first weld set up parameter and at least one first weld instruction and said second weld schedule defining at least one second weld set up parameter and at least one second weld instruction with at least one of said second weld set up parameter and said second weld instruction being different from said first weld set up parameter and said first weld instruction; determining completion of said first weld schedule by said welding operator; automatically modifying the welding equipment in accordance with said second weld schedule without said welding operator intervention; and monitoring the welding operations. In the embodiment, the method can include automatically modifying the welding equipment in accordance with said second weld schedule is based on said completion of said first weld schedule.

In an embodiment, a semi-automatic welding work cell for use by an operator is provided. The embodiment can include welding equipment having a plurality of functions for performing welds by the operator and a welding job sequencer selecting from the plurality of functions to set up and organize the welding equipment for the operator. The embodiment can include the plurality of functions including: a weld schedule function defined by a sequence of weld operations; a notify function to instruct the operator to perform the weld schedule; and a quality check function to monitor at least one weld operation of the sequence of weld operations.

In the embodiment, the quality check function performs a quality check on a weld completed by the at least one weld operation. In the embodiment, the quality check function monitors the at least one weld operation during the at least one weld operation. In the embodiment, the quality check function monitors the at least one weld operation after completion of the at least one weld operation. In the embodiment, the weld schedule function defines a plurality of weld schedules, each weld schedule having a first weld operation and at least a second weld operation. In the embodiment, the quality check function monitors the at least one weld operation before allowing the sequence of weld operations to continue. In the embodiment, the quality check function detects an abnormality, the sequencer pauses the sequence of weld operations and the notify function alerts the operator of the abnormality.

Figure 3:
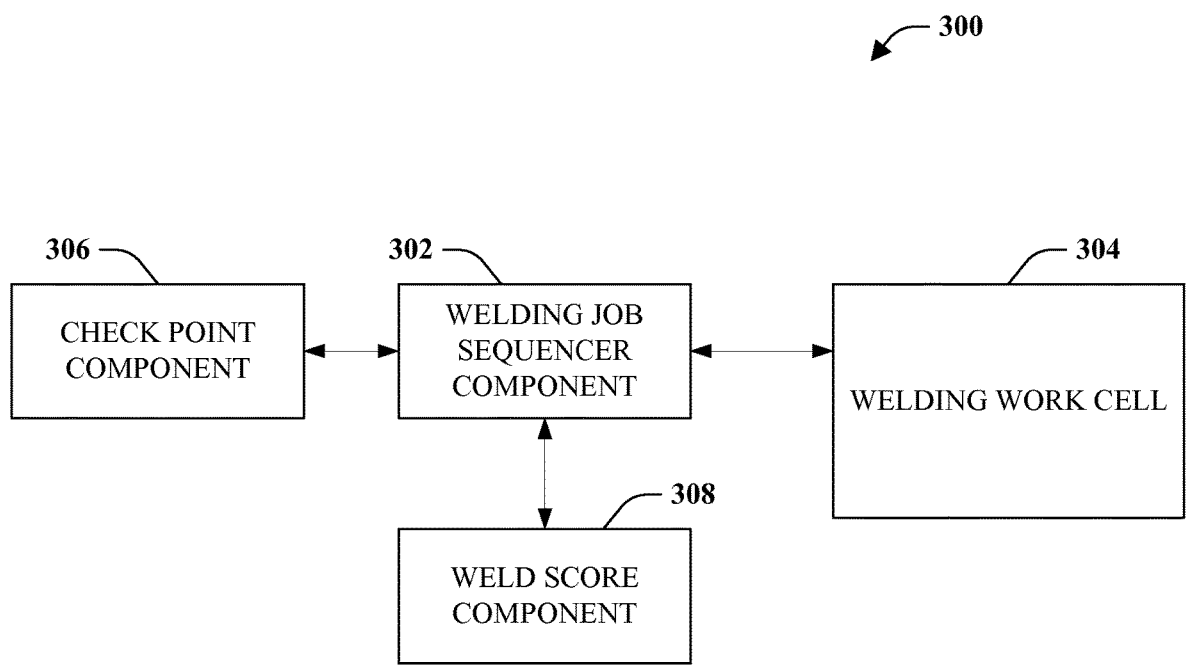
FIG. 3 is a block diagram illustrating a welding system that utilizes a welding job sequencer component to configure welding equipment for two or more weld operations to assembly a workpiece.

FIG. 3 is a schematic block diagram of an exemplary embodiment of welding system 300 that utilizes welding job sequencer component 302 to configure welding equipment for two or more weld operations to assembly a workpiece. Welding job sequencer component 302 that is configured to implement a welding sequence that includes settings, configurations, and/or parameters to perform two or more welding procedures on a workpiece. In particular, welding job sequencer component 302, as discussed above as welding job sequencer, automatically configures welding equipment to create two or more welds that include two or more welding schedules. Moreover, welding job sequencer component 302 utilizes the welding sequence to aid an operator to perform the two or more welds. As discussed above, welding job sequencer component 302 can be utilized with welding work cell 304 that is semi-automatic. However, it is to be appreciated and understood that welding job sequencer component 302 can be implemented in a suitable welding environment or system that includes at least welding equipment and an operator to facilitate creating one or more welds.

Welding system 300 further includes check point component 306 that is configured to monitor a welding process and/or a welding operator in real time. For instance, the welding process is monitored in real time to detect at least one of a welding parameter (e.g., voltage, current, among others), a welding schedule parameter (e.g., welding process, wire type, wire size, WFS, volts, trim, wire feeder to use, feed head to use, among others), a weld on a workpiece as the weld is created, a movement of an operator, a position of a welding tool, a position or location of a welding equipment, a position or location of an operator, sensor data (e.g., video camera, image capture, thermal imaging device, heat sensing camera, temperature sensor, among others), and the like. Check point component 306 includes an alert system (not shown) that can communicate an alert or notification to indicate a status of the real time monitoring. In an embodiment, check point component 306 can utilize thresholds, ranges, limits, and the like for the real time monitoring to precisely identify a abnormality with welding system 300. Furthermore, check point component 306 can communicate an alert or notification to welding work cell 304 or the operator to at least one of stop the welding procedure, continue with the welding procedure, pause the welding procedure, terminate the welding procedure, or request approval of the welding procedure. In an embodiment, check point component 306 can store monitoring data (e.g., video, images, results, sensor data, and the like) in at least one of a server, a data store, a cloud, a combination thereof, among others.

Weld score component 308 is included with welding system 300 and is configured to evaluate a weld created by an operator within welding work cell 304 upon completion of such weld. Weld score component 308 provides a rating or score for the completed weld to facilitate implementing a quality control on the workpiece and/or assembly of the workpiece. For instance, weld score component 308 can alert a quality inspection upon completion, provide data collection of a job (e.g., assembly of workpiece, weld on workpiece, among others), and the like. In an embodiment, an in-person quality inspection can be performed upon completion of a portion of the assembly (e.g., completion of a weld, completion of two or more welds, completion of assembly, among others). In another embodiment, weld score component 308 can utilize a sensor to collect data (e.g., video camera, image capture, thermal imaging device, heat sensing camera, temperature sensor, among others) to determine approval of the job. For instance, a quality inspection can be performed remotely via video or image data collected upon completion of a job.

It is to be appreciated that welding job sequencer component 302 can be a stand-alone component (as depicted), incorporated into welding work cell 304, incorporated into check point component 306, incorporated into weld score component 308, or a suitable combination thereof. Additionally, as discussed below, welding job sequencer component 302 can be a distributed system, software-as-a-service (SaaS), a cloud-based system, or a combination thereof. Further, it is to be appreciated and understood that check point component 306 can be a stand-alone component (as depicted), incorporated into welding work cell 304, incorporated into welding job sequencer component 302, incorporated into weld score component 308, or a suitable combination thereof. Additionally, check point component 306 can be a distributed system, software-as-a-service (SaaS), a cloud-based system, or a combination thereof. Moreover, it is to be appreciated and understood that weld score component 308 can be a stand-alone component (as depicted), incorporated into welding work cell 304, incorporated into welding job sequencer component 302, incorporated into check point component 306, or a suitable combination thereof. Additionally, weld score component 308 can be a distributed system, software-as-a-service (SaaS), a cloud-based system, or a combination thereof.

Figure 4:
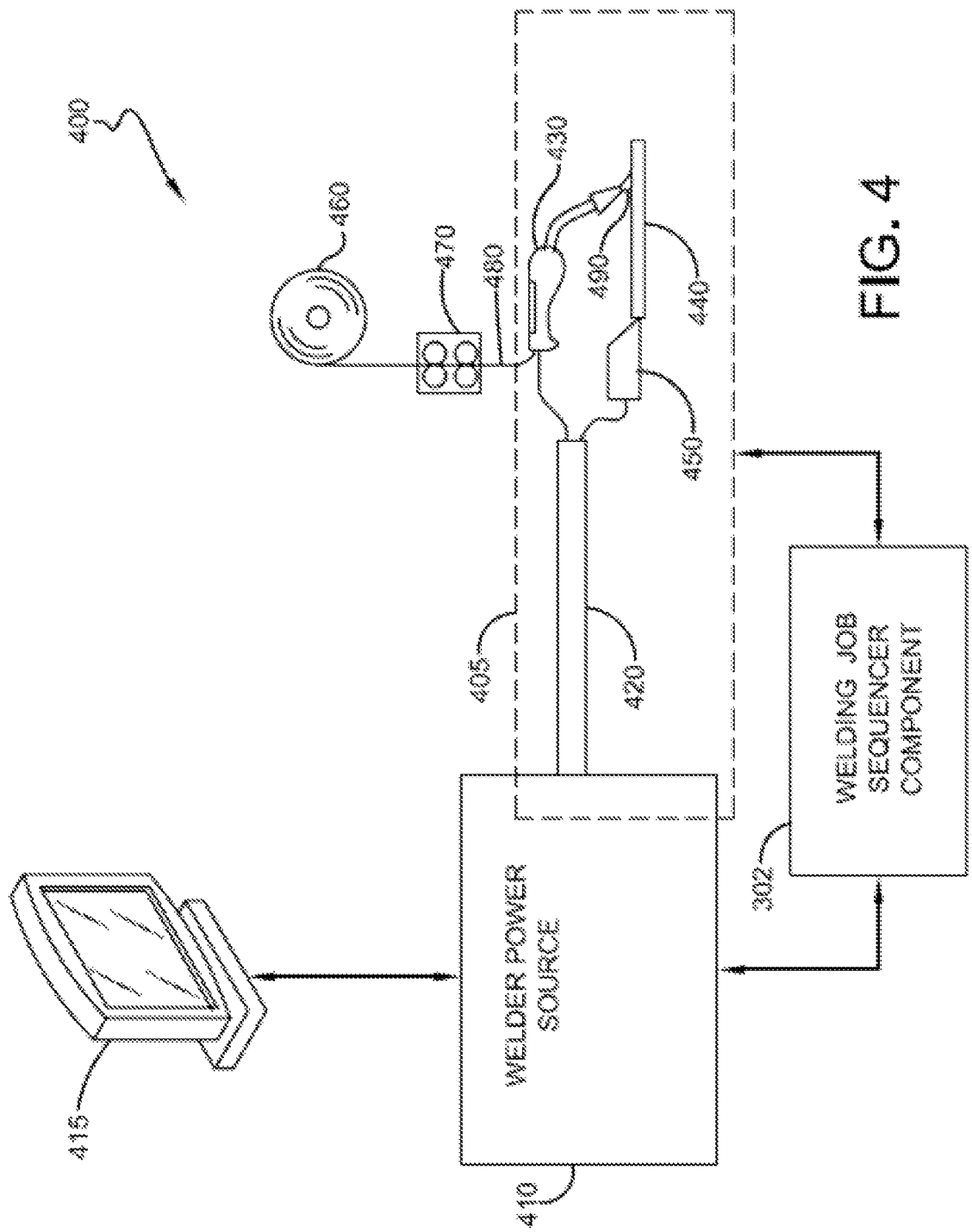
FIG. 4 is a block diagram illustrating a welding system that utilizes a welding job sequencer component.

FIG. 4 illustrates a schematic block diagram of an exemplary embodiment of welding system 400 including welding circuit path 405. It is to be appreciated that welding system 400 is also referred to as the welding work cell, wherein the welding work cell and/or welding system 400 can produce welds or welded parts. Welding system 400 includes welder power source 410 and display 415 operationally connected to welder power source 410. Alternatively, display 415 may be an integral part of welder power source 410. For instance, display 415 can be incorporated into welder power source 410, a stand-alone component (as depicted), or a combination thereof. Welding system 100 further includes welding cable 120, welding tool 430, workpiece connector 450, spool of wire 460, wire feeder 470, wire 480, and workpiece 440. Wire 480 is fed into welding tool 430 from spool 460 via wire feeder 470, in accordance with an embodiment of the present invention. In accordance with another embodiment of the present invention, welding system 400 does not include spool of wire 460, wire feeder 470, or wire 480 but, instead, includes a welding tool comprising a consumable electrode such as used in, for example, stick welding. In accordance with various embodiments of the present invention, welding tool 430 may include at least one of a welding torch, a welding gun, and a welding consumable.

Welding circuit path 405 runs from welder power source 410 through welding cable 420 to welding tool 430, through workpiece 440 and/or to workpiece connector 450, and back through welding cable 420 to welder power source 110. During operation, electrical current runs through welding circuit path 405 as a voltage is applied to welding circuit path 405. In accordance with an exemplary embodiment, welding cable 420 comprises a coaxial cable assembly. In accordance with another embodiment, welding cable 420 comprises a first cable length running from welder power source 410 to welding tool 430, and a second cable length running from workpiece connector 450 to welder power source 410.

Welding system 400 includes welding job sequencer component 302 (as described above). Welding job sequencer component 302 is configured to interact with a portion of welding system 400. For instance, welding job sequencer component 302 can interact with at least the power source 410, a portion of welding circuit path 405, spool of wire 460, wire feeder 470, or a combination thereof. Welding job sequencer component 302 automatically adjusts one or more elements of welding system 400 based on a welding sequence, wherein the welding sequence is utilized to configure welding system 400 (or an element thereof) without operator intervention in order to perform two or more welding procedures with respective settings or configurations for each welding procedure.

In an embodiment, welding job sequencer component 302 employs a welding sequence to automatically configure welding equipment. It is to be appreciated that welding system 400 or welding work cell can employ a plurality of welding sequences for assembly of one or more workpieces. For instance, a workpiece can include three (3) welds to complete assembly in which a first welding sequence can be used for the first weld, a second welding sequence can be used for the second weld, and a third welding sequence can be used for the third weld. Moreover, in such example, the entire assembly of the workpiece including the three (3) welds can be referenced as a welding sequence. In an embodiment, a welding sequence that includes specific configurations or steps can further be included within a disparate welding sequence (e.g., nested welding sequence). A nested welding sequence can be a welding sequence that includes a welding sequence as part of the procedure. Moreover, the welding sequence can include at least one of a parameter, a welding schedule, a portion of a welding schedule, a step-by-step instruction, a portion of media (e.g., images, video, text, and the like), a tutorial, among others. In general, the welding sequence can be created and employed in order to guide an operator through welding procedure(s) for specific workpieces without the operator manually setting welding equipment to perform such welding procedures. The subject innovation relates to creating a welding sequence and/or modifying a welding sequence.

One or more welder power source(s) (e.g., welder power source 410) aggregates data respective to a respective welding process to which the welder power source is providing power to implement. Such collected data relates to each welder power source and is herein referred to as "weld data." Weld data can include welding parameters and/or information specific to the particular welding process the welder power source is supplying power. For instance, weld data can be an output (e.g., a waveform, a signature, a voltage, a current, among others), a weld time, a power consumption, a welding parameter for a welding process, a welder power source output for the welding process, and the like. In an embodiment, weld data can be utilized with welding job sequencer component 302. For example, weld data can be set by a welding sequence. In another example, weld data can be used as a feedback or a feedforward loop to verify settings.

In one embodiment, welding job sequencer component 302 is a computer operable to execute the disclosed methodologies and processes, including methods 1100 and 1200 described herein. In order to provide additional context for various aspects of the present invention, the following discussion is intended to provide a brief, general description of a suitable computing environment in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with welding job sequencer 302.

Welding job sequencer 302 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within welding job sequencer 302, such as during start-up, is stored in the ROM.

Welding job sequencer 302 can further include a hard disk drive, a magnetic disk drive, e.g., to read from or write to a removable disk, and an optical disk drive, e.g., for reading a CD-ROM disk or to read from or write to other optical media. Welding job sequencer 302 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by welding job sequencer 302.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), Near Field Communications (NFC), Radio Frequency Identification (RFID), infrared, and/or other wireless media. Combinations of any of the above should also be included within the scope of computer readable media.

A number of program modules may be stored in the drives and RAM, including an operating system, one or more application programs, other program modules, and program data. The operating system in welding job sequencer 302 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor (e.g., display 415), or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display (in addition or in combination with display 415) can be employed with welding job sequencer 302 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from welding job sequencer 302 via any wireless or hard wire protocol and/or standard. In another example, welding job sequencer 302 and/or system 400 can be utilized with a mobile device such as a cellular phone, a smart phone, a tablet, a portable gaming device, a portable Internet browsing device, a Wi-Fi device, a Portable Digital Assistant (PDA), among others.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Alternatively or in addition, a local or cloud (e.g., local, cloud, remote, among others) computing platform can be utilized for data aggregation, processing, and delivery. For this purpose, the cloud computing platform can include a plurality of processors, memory, and servers in a particular remote location. Under a software-as-a-service (SaaS) paradigm, a single application is employed by a plurality of users to access data resident in the cloud. In this manner, processing requirements at a local level are mitigated as data processing is generally done in the cloud, thereby relieving user network resources. The software-as-a-service application allows users to log into a web-based service (e.g., via a web browser) which hosts all the programs resident in the cloud.

Figure 5:
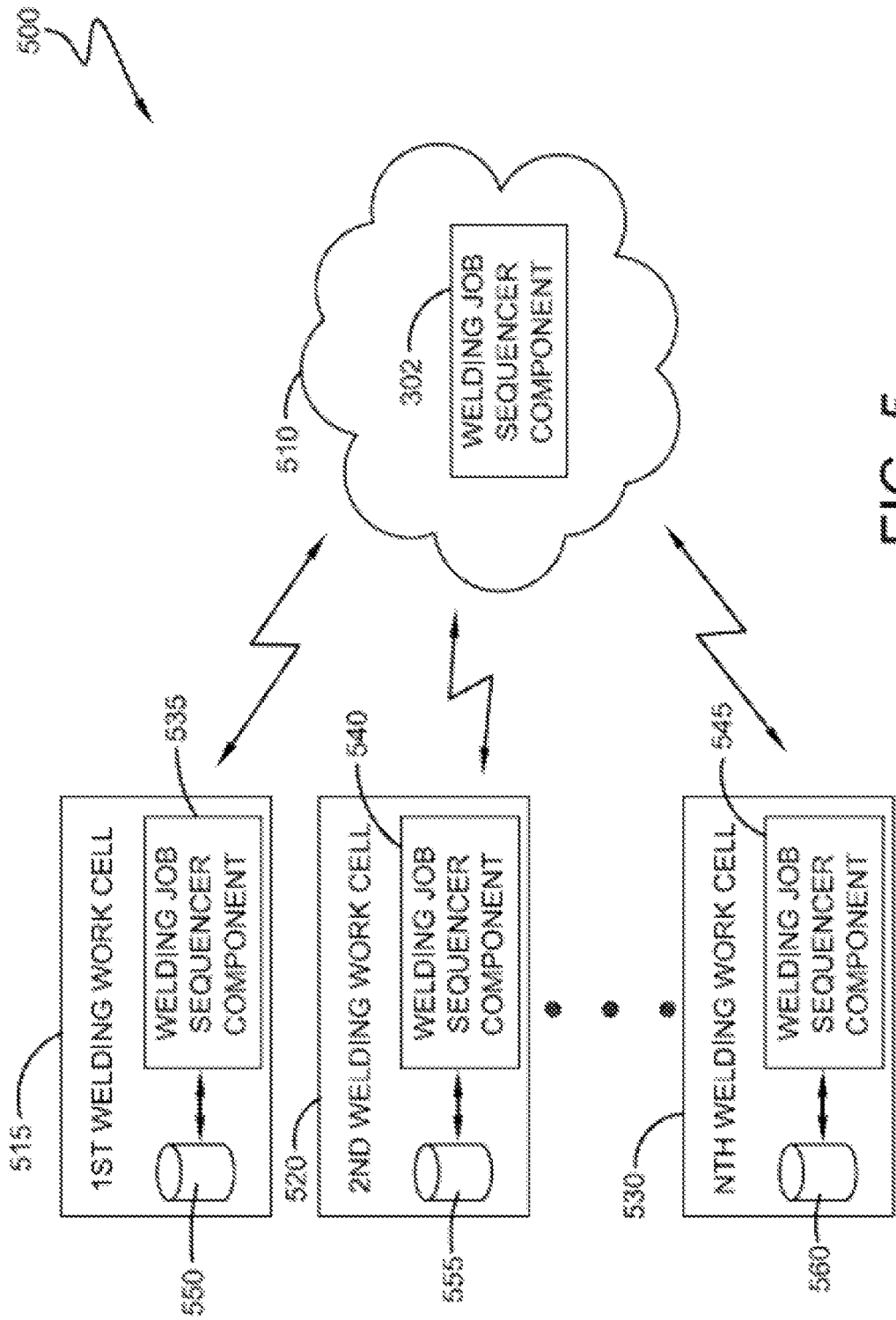
FIG. 5 is a block diagram illustrating a distributed welding environment with a plurality of welding work cells that interface with a welding job sequencer component via a local, remote, or cloud database.

Turning to FIG. 5, system 500 illustrates a welding environment with a plurality of welding work cells via a local, remote, or cloud database. System 500 includes a plurality of welding work cells such as first welding work cell 515, second welding work cell 520 to Nth welding work cell 530, where N is a positive integer. In an embodiment, each welding work cell includes a welding job sequencer component 535, 540, and 545, that is used to implement a welding schedule(s) to each welding work cell as well as or in the alternative to an enterprise-wide welding operation(s) and/or enterprise-wide welding work cell. Welding sequence(s) from each welding job sequencer component 535, 540, and 545 is received from the local or cloud database (e.g., local database, cloud database, remote database, among others) computing platform 510.

In an embodiment, each welding work cell further includes a local data store. For instance, first welding work cell 515 includes welding job sequencer component 535 and data store 550, second welding work cell 520 includes welding job sequencer component 540 and data store 555, and Nth welding work cell 530 includes welding job sequencer component 545 and data store 560. It is to be appreciated that system 500 includes welding job sequencer 302 hosted by computing platform 510 in which each welding work cell includes a distributed and respective welding job sequencer component. Yet, it is to be understood that welding job sequencer 302 (and distributed welding job sequencer components 535, 540, and 545) can be a stand-alone component in each welding work cell or a stand-alone component in the computing platform 510.

Each welding work cell can include a respective data store that stores a portion of at least one welding sequence. For instance, welding sequences related to a welding process A is employed at one or more welding work cell. The welding sequence is stored in a respective local data store (e.g., data stores 550, 555, and 560). Yet, it is to be appreciated and understood that each welding work cell can include a local data store (as depicted), a collective and shared remote data store, a collective and shared local data store, a cloud data store hosted by computing platform 510, or a combination thereof. A "data store" or "memory" can be, for example, either volatile memory or nonvolatile memory, or can include both volatile and nonvolatile memory. The data store of the subject systems and methods is intended to comprise, without being limited to, these and other suitable types of memory. In addition, the data store can be a server, a database, a hard drive, a flash drive, an external hard drive, a portable hard drive, a cloud-based storage, a solid-state drive, and the like.

For instance, welding job sequencer component 302 can manage each welding job sequencer component 535, 540, 545 in each welding work cell 515, 520, 530. In another embodiment, the communications can be transmitted from the welding job sequencer 302 to each welding work cell (e.g., each welding job sequencer component). In another embodiment, the communications can be received from each welding work cell (e.g., each welding job sequencer component) from the welding job sequencer component 302. For instance, a welding sequence can be used with $1^{st}$ welding work cell 515 and communicated directly to a disparate welding work cell or via computing platform 510.

Figure 6:
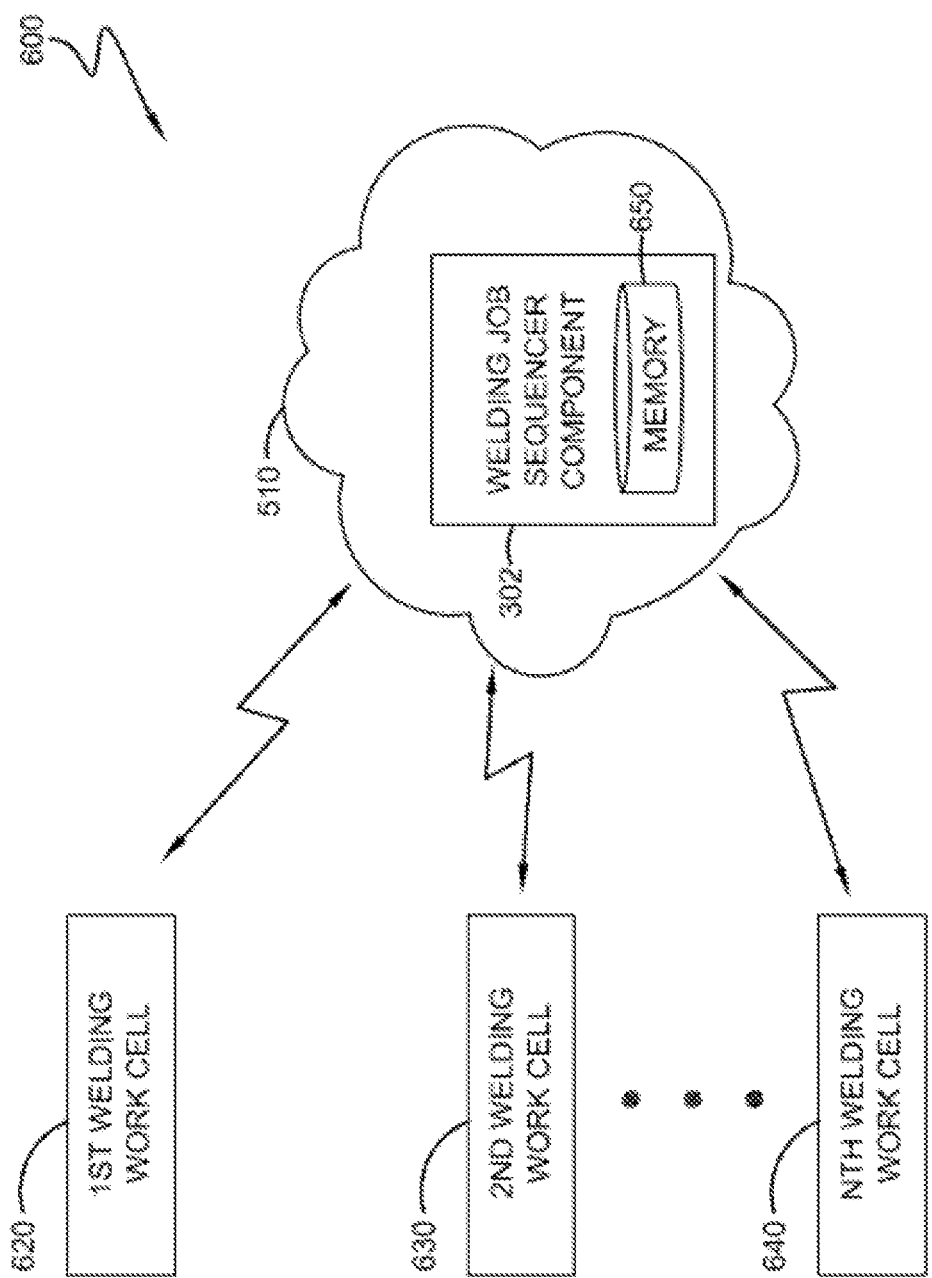
FIG. 6 is a block diagram illustrating a welding system that includes a plurality of welding work cells in which welding work cells are managed by a cloud-based welding job sequencer component.

FIG. 6 illustrates welding system 600 that includes a plurality of welding work cells in which welding job sequencer component 302 is hosted with computing platform 510 to utilize one or more welding sequences to configure welding equipment within one or more welding systems, welding environments, and/or welding work cells. Welding system 600 includes a local or cloud-based welding job sequencer component 302 hosted in computing platform 510. Welding job sequencer component 302 can utilize a welding sequence with a number of welding work cell. For instance, welding system 600 can a number of welding work cells such as, but not limited to, $1^{st}$ welding work cell 620, $2^{nd}$ welding work cell 630, to Nth welding work cell, where N is a positive integer. It is to be appreciated that the locality of the welding job sequencer component 302 is in relation to each $1^{st}$ welding work cell 620, $2^{nd}$ welding work cell 630, and/or Nth welding work cell 640.

In an embodiment, welding job sequencer 302 communicates one or more welding sequence to a target welding work cell, wherein the target welding work cell is a welding work cell that is to utilize the communicated welding sequence. Yet, in another embodiment, welding job sequencer 302 utilizes memory 650 hosted by computing platform 510 in which one or more welding sequences are stored. Yet, the stored welding sequence can be related or targeted to one or more welding work cells regardless of a storage location (e.g., local, cloud, remote, among others).

Figure 7:
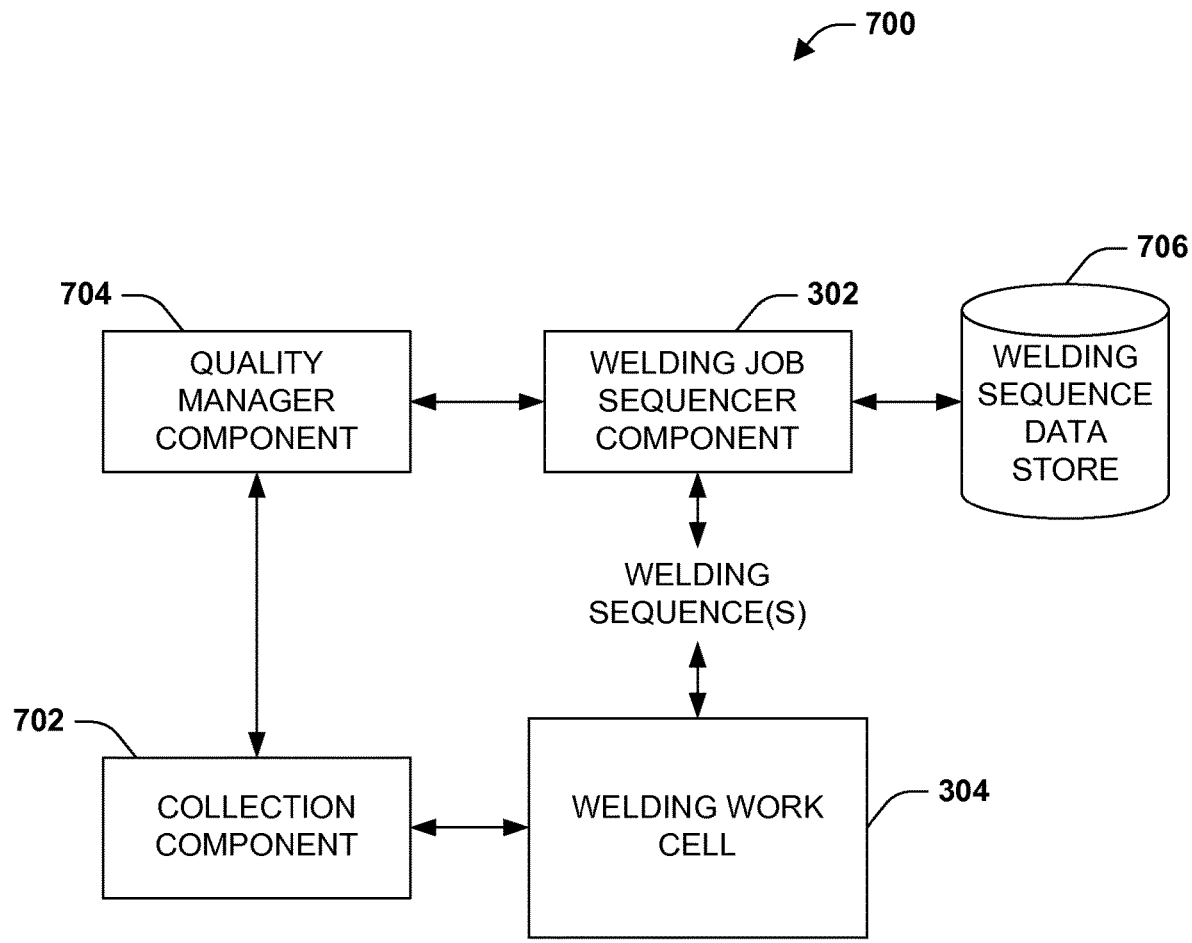
FIG. 7 is a block diagram illustrating a system that aggregates data associated with a welding operation performed with a welding sequence.

FIG. 7 illustrates system 700 that aggregates data associated with a welding operation performed with a welding sequence. As discussed above, welding sequence is used by welding job sequencer component 302 to perform two or more welds with two or more respective welding parameters (e.g., welding schedules, parameters, configurations, settings, and the like) within welding work cell 304. In particular, one or more welding sequences are employed to automatically configure welding equipment without operator intervention to perform a first welding operation with a first welding schedule and a second welding operation with a second welding schedule. It is to be appreciated that a welding sequence can include additional steps or procedures to implement within welding work cell 304 (as discussed below). Welding job sequencer component 302 is configured to implement one or more welding sequence(s) to perform a welding operation, wherein the welding sequence(s) can be stored on welding sequence data store 706. Welding sequence(s) can be identified or selected and loaded or used from welding sequence data store 706.

It is to be appreciated that the welding sequence(s) can be executed from welding sequence data store 706, downloaded and executed locally (e.g., local in reference to where a weld is performed with the welding sequence), or a combination thereof. As discussed above, data store (here, welding sequence data store 706) can be, for example, either volatile memory or nonvolatile memory, or can include both volatile and nonvolatile memory. The data store (here, welding sequence data store 706) of system 700 is intended to comprise, without being limited to, these and other suitable types of memory. In addition, the data store can be a server, a database, a hard drive, a flash drive, an external hard drive, a portable hard drive, a cloud-based storage, a solid-state drive, and the like. It is to be appreciated that input data received or registered (discussed below) can be stored in a dedicated data store for such data, welding sequence data store, a remote data store, a cloud-based environment, a combination thereof, among others.

System 700 further includes collection component 702 that is configured to collect real time data from a welding operation that uses a welding sequence. In general, collection component 702 collects, receives, and/or aggregates a welding parameter from a weld being performed with use of a portion of a welding sequence. For instance, a welding parameter is aggregated, received, or collected in real time for a welding sequence that is used to perform one or more welds. By way of example and not limitation, the welding parameter can be at least one of a parameter for the weld (e.g., voltage, current, among others), a welding schedule parameter (e.g., welding process, wire type, wire size, wire feed speed (WFS), volts, trim, wire feeder to use, feed head to use, among others), a movement of an operator, a position of a welding tool, a position or location of a welding equipment, a position or location of an operator, a location or position of a body part of an operator, sensor data (e.g., video camera, image capture, thermal imaging device, heat sensing camera, temperature sensor, among others), physical weld appearance (e.g., weld size, weld shape, weld dimension(s), and the like), welding equipment configurations (e.g., power source settings, waveforms, wire feed speed, and the like), welder setup (e.g., workpiece type, wire type, material type, weld to perform, and the like), a time to create a weld, a fixture location, a cost to create the weld (e.g., cost includes electricity, electrode, gas, employee pay, among others), a speed for a welding tool, among others. By way of example and not limitation, a fixture secures the workpiece from movement during the first weld or the second weld. For instance, a fixture can be a clamp, a temporary weld (e.g., a tack weld), among others. Still, it is to be appreciated and understood that any welding parameter can be selected with sound engineering judgment without departing from the intended scope of coverage of the embodiments of the subject invention.

The real time welding parameter is stored and associated with a welding sequence that was utilized while creating a weld by collection component 702. In other words, welding parameter(s) can be tracked and monitored for each welding sequence used in order to evaluate data and configure welding equipment, welding technique of the operator, among others. The welding parameter aggregated can be associated to the corresponding welding sequence (e.g., where corresponding refers to the welding sequence that was used while collecting the welding parameter) by metadata, metadata tags, data storage techniques, data store management, naming conventions, among others. It is to be appreciated that any suitable technique can be employed to ensure that a welding sequence is matched or corresponded to real time collected welding parameter(s).

System 700 further includes quality manager component 704 that is configured to collect quality assurance data and create a modeled welding parameter (e.g., also referred to as welding parameter model). In an embodiment, quality manager component 704 collects quality assurance data during a performance of a weld for a specific welding sequence. Tracking the quality assurance data for each welding sequence allows for evaluation of each weld during each portion of the welding sequence, wherein such tracking allows for increased results, quality, and the like. In an embodiment, quality manager component 704 is further configured to interact or communicate with the weld score component (discussed in FIG. 3) and/or the check point component (discussed in FIG. 3). For instance, quality assurance data can be collected by quality manager component 704 on a periodic time frequency, at a particular point or step during the welding sequence, at a beginning and/or end of a welding sequence, among others. In an example, snapshots can be collected on a timely basis, wherein quality assurance data is collected and reviewed in real time. If the quality assurance data is not up to a defined standard, the welding sequence can be halted, stopped, restarted, eliminated, among others.

Quality manager component 704 leverages real time welding parameter(s) for each welding sequence and generates a modeled welding parameter based thereon. This modeled welding parameter is used for the corresponding welding sequence to maintain quality of welding operations performed with welding sequences. In an embodiment, the modeled welding parameter can be based on real time collected welding parameter(s) for each welding sequence. In another embodiment, the modeled welding parameter can be based on a real time collected welding parameter during a welding training session, a virtual welding session, a welding simulation, or a specific welding session to create a modeled welding parameter. For instance, a welding parameter A can be monitored in real time and collected for each instance that welding sequence W is used. After a duration of time or two or more welds, this data collected for welding parameter A can be evaluated to create a modeled welding parameter A'. The modeled welding parameter A' can be used for welding operations that employ the welding sequence W so as to maintain consistency and/or quality. In another example, more than one welding parameter can be collected in real time to create one or more welding parameter models. For instance, data for welding parameters A and B can be used with welding sequence W from which modeled welding parameter AB' can be generated for use with welding sequence W. It is to be appreciated that any suitable number of welding parameters can be used to create a welding parameter model and the above discussion is provided for example.

The term "modeled welding parameter" and/or "welding parameter model" as used herein can be defined as a targeted value for a measurement or reading of a welding parameter in real time, wherein the targeted value is based on two or more real time measurements (e.g., welding parameter real time measurements) for a specific welding sequence and created weld. It is to be appreciated that the "modeled welding parameter" and/or "welding parameter model" can be user-defined, identified with statistical analysis of two or more real time welding parameters, identified via a user performance of a weld with a welding sequence to detect a real time welding parameter, or a combination thereof. By way of example and not limitation, the statistical analysis can be an average of two or more real time welding parameter, a range based on two or more real time welding parameters, a threshold tolerance based on one or more real time welding parameter, a weighted average of two or more real time welding parameters, a median, a standard deviation, among others. Still, it is to be appreciated and understood that a modeled welding parameter and/or a welding parameter model can be employed with any formula using two or more real time welding parameters can be selected with sound engineering judgment without departing from the intended scope of coverage of the embodiments of the subject invention.

It is to be appreciated that real time collection of a welding parameter for a welding sequence can be utilized in one or more environments independent of a source or collection of the welding parameter (e.g., independent of where a welding sequence is used and where the data collection takes place). For instance, an operator can perform two or more welds with welding sequence W in welding environment A and further utilize welding parameters collected from the two or more welds with welding sequence W to create a welding parameter model in welding environment B. In another example, real time data for welding parameters can be collected (while using welding sequence W) across welding environment A and welding environment B to create a welding parameter model for the welding sequence W for use in welding environment A, welding environment B, and/or welding environment C.

In an example, a welding sequence can include a quality assurance collection (e.g., also referred to as collection quality assurance data). The welding sequence can be created, edited, or modified to include a quality assurance collection for at least one of a welding work cell, a welding equipment, or one or more welds. By way of example and not limitation, the quality assurance collection can be a data capture of at least one of welding equipment (e.g., settings, physical location, consumable amount, and the like), the operator (e.g., physical location of person, location of arms, location of hands, and the like), or a weld (e.g., dimensions, size, location of weld, among others). It is to appreciated that the data collection can be video, audio, images, settings, welding equipment settings, physical location of the operator, movements from the operator, and the like. For instance, a quality assurance collection can be included with a welding sequence as a step therein in which the collection is on a particular frequency, duration of time, or a point in a welding procedure (e.g., middle of weld, end of weld, and the like). Thus, a welding environment, welding system, and/or welding work cell can have quality assurance data collected in real time. In an example, a quality assurance collection can be a step in a welding sequence at a particular point in the welding procedure. In a particular example, the welding sequence can be evaluated over time to identify specific parts or areas a weld includes an error. In such example, the quality assurance collection can be configured to gather data at a point in time prior to the particular point in order to avoid the error.

In an example, a welding sequence can include a replenishment of a consumable. The welding sequence can be created or edited to include a replenishment of a consumable for at least one of a welding work cell, a welding equipment, among others. For instance, a replenishment of a consumable can be included with a welding sequence after a period of time, wherein the period of time is estimated based on the duration the welding equipment is used (e.g., estimate the use of consumables). Thus, a welding environment, welding system, and/or welding work cell can be evaluated in real time or from collected real time data and identify data to determine a replenishment of a consumable.

In another example, a welding sequence can include an inspection or a repair. The welding sequence can be created or edited to include an inspection request or a repair request based on a factor such as, but not limited to, a time, a duration, among others. A welding work cell can have a maintenance period for a particular time and if a welding sequence is created for such welding work cell, a repair or maintenance can be included with the created welding sequence. Thus, a welding environment, welding system, and/or welding work cell can be evaluated in real time or from collected real time data and identify data to determine inspections or repairs.

In another example, a welding sequence can include a pre-shift routine that is performed prior to a welding operation. For instance, a shift can be part of a scheduling of operators or employees, wherein the shift is a duration of time when operators are working. As an example, a shift can be from seven (7) am to three (3) pm. Based on gathered historic welding data or real time welding data, an estimation of welding time can be calculated to facilitate determining maintenance to perform on welding equipment. In an embodiment, at least one of gas flow, tip condition, tip replacement, nozzle inspection, nozzle replacement, among others can be included within a welding sequence based on the estimation of welding time.

Furthermore, it is to be appreciated and understood that collection component 702 can be a stand-alone component (as depicted), incorporated into welding job sequencer component 302, incorporated into welding equipment (not shown), incorporated into quality manager component 704, incorporated into welding work cell 304, or a combination thereof. Additionally, welding job sequencer component 302 can be a stand-alone component (as depicted), incorporated into collection component 702, incorporated into welding equipment (not shown), incorporated into quality manager component 704, incorporated into welding work cell 304, or a combination thereof. Further, welding sequence data store 706 can be a local data store, a remote data store, a cloud-based data store, a computing platform, and/or any other network or computing environment configuration discussed above in regards to the welding job sequencer component.

Figure 8:
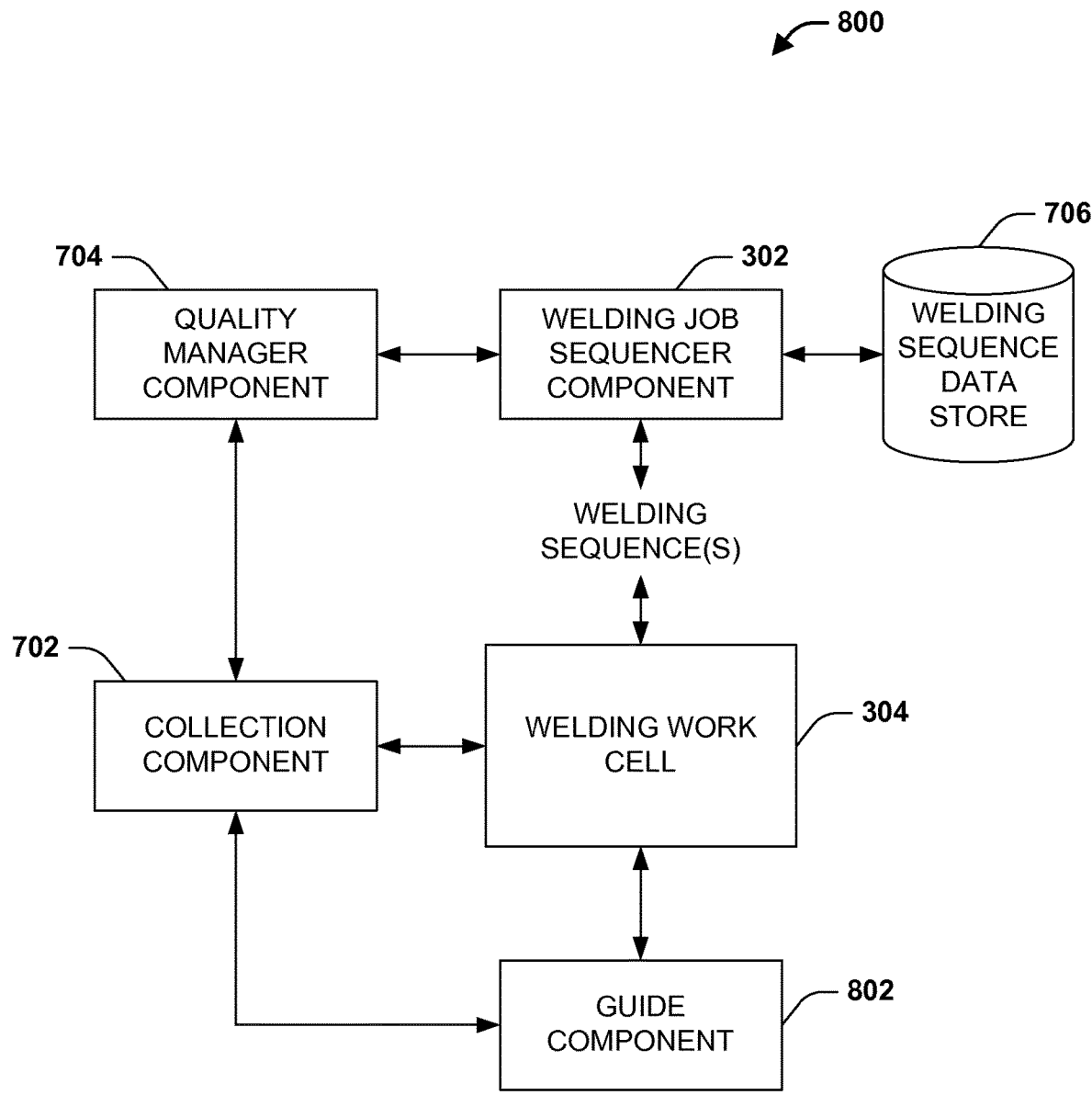
FIG. 8 is a block diagram illustrating a system that communicates a portion of media to an operator to facilitate creating a weld with a welding procedure.

FIG. 8 illustrates system 800 that communicates a portion of media to an operator to facilitate creating a weld with a welding procedure. System 800 further includes guide component 802 that is configured to provide data to welding work cell 304 to facilitate creation of a weld using a welding sequence, wherein the data is related to a portion of media (e.g., audio, video, image, and the like). In an example, the portion of media can be of a weld (e.g., physical appearance), a welding torch (e.g., orientation, location, etc.), a workpiece (e.g., fixture location, etc.), a body part of the operator (e.g., hand location, body location, among others), or a combination thereof. In an embodiment, guide component 802 receives a portion of media corresponding to a welding sequence or a portion of a welding sequence (e.g., a step, a part, etc.) and provides such portion of media to an operator performing a welding using the welding sequence or the portion of the welding sequence. In another embodiment, guide component collects the portion of media via quality manager component 704. For instance, a portion of media can be stored for a weld performed (with a welding sequence) that has one or more welding parameters identified for the modeled welding parameter. In another instance, a pre-defined portion of media can be assigned to each portion of the welding sequence. In general, a portion of media is presented to the operator, wherein the portion of media is based at least in part upon a modeled welding parameter, a welding parameter model, a user-defined portion of media, a simulated welding operation, a virtual welding operation, among others.

Guide component 802 is further configured to communicate the portion of media that corresponds to the welding sequence being used. By way of example and not limitation, the portion of media can be communicated via a device (e.g., smartphone, speaker, display, handheld, portable gaming device, tablet, laptop, monitor, television, among others). Moreover, the portion of media can be displayed onto or using an equipment of the operator. By way of example and not limitation, equipment of the operator can be a helmet, a visor, a pair of glasses, a glove, an apron, a jacket, a welding sleeve, an identification badge of the operator, an earpiece, a pair of headphones, an ear plug, a headband, a bandana, a watch, an item of jewelry (e.g., ring, necklace, bracelet, among others), and the like.

In an embodiment, guide component 802 can display a hologram (e.g., holographic images, 3D images, 3D video, holographic video, and the like) onto at least one of an equipment of the user, a workpiece, or a surface that the workpiece is situated. The hologram can be a "ghosting" that shows a performance of a weld with the welding sequence so as to communicate or show to the operator the positions (e.g., operator physical location, fixture location, welding torch angle/position, workpiece location, etc.), motions (e.g., welding torch motions to create weld, and the like), rate (e.g., speed of which to make the weld, and the like), weld dimensions (e.g., weld size, look of weld, and the like), among others.

In another embodiment, guide component 802 can display a location to the operator on where to weld for the welding sequence, wherein the location is displayed via indicator (e.g., a light, a target, a graphic, an image, among others). For instance, a visor on the operator can have an indicator displayed thereon such that from the view of the operator, the indicator is positioned on a location to where the weld for the welding sequence should be performed.

Figure 9:
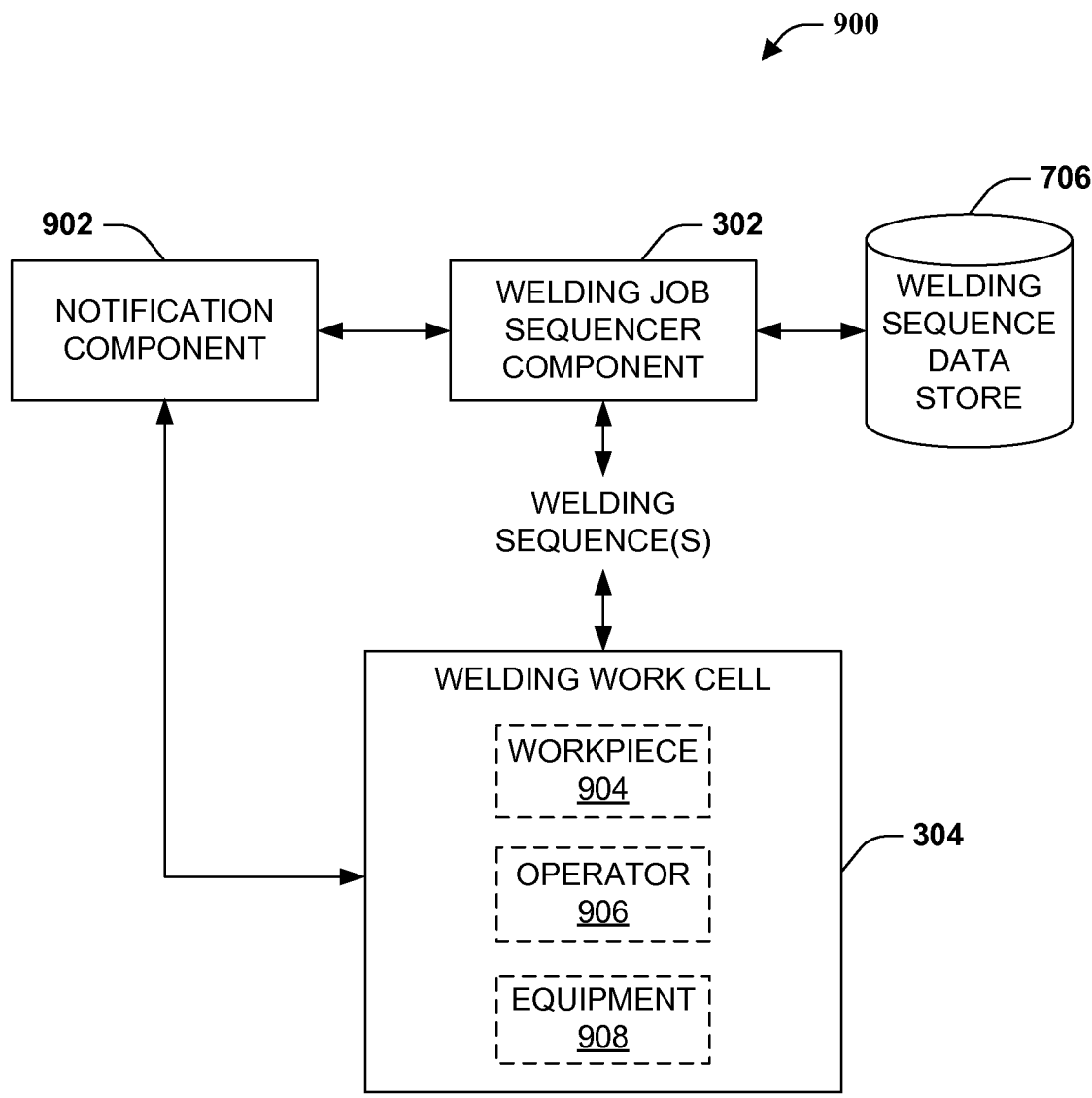
FIG. 9 is a block diagram illustrating a system that communicates an alert to an operator performing one or more welds using a welding sequence.

FIG. 9 illustrates system 900 that communicates an alert to an operator performing one or more welds using a welding sequence. System 900 includes notification component 902 that communicates an alert to welding work cell 304. In particular, notification component 902 can communicate an alert to at least one of workpiece 904, operator 906, and/or equipment 908. It is to be appreciated that the alert can be communicated in order to relay information/notification related to at least one of the welding sequence being used, a quality assurance condition (e.g., real time monitoring compared to modeled welding parameter(s), not within a range or tolerance level, motion or movement making weld is improper, among others), a work environment condition (e.g., a lunch break, a break time, a time of the day, an end of shift, a public address (PA) announcement, an evacuation announcement, a fire alarm, an emergency alarm, start of shift, an end of a break, an end of lunch, among others), welding equipment (e.g., welding torch at improper position, among others), welding consumable (e.g., replenishment warning, amount/level of consumable, stick-out is too short, stick-out is too long, among others), safety concerns (e.g., proximity to welding torch, proximity to welding equipment, among others), or a combination thereof.

For instance, notification component 902 can display a red light on workpiece 904 to alert operator 906 to halt performing the weld based on a detected issue (e.g., See above examples). In another instance, an audio signal can be used to communicate to operator 906 that welding for a specific workpiece is complete or has passed a quality check. In another instance, a green light can illuminate equipment 908 that requires replenishment of a consumable. For example, alerts can provide guidance to operator 906 for a sequence on how to replace a consumable. In another example, a vibration or haptic feedback alert can be communicated to operator 906.

In another example, background music can be played for operator 906 which is interrupted based on an alert or other communication. In a particular example, the background music can be modified (e.g., increase tempo, reduce tempo, change genre of music, change category of music, change artist, among others) to correspond to the alert communicated to operator 906. For instance, if operator is performing a weld with a welding sequence at a faster pace, a tempo of the background music can be changed (e.g., increased to communicate the pace is too fast, slowed to communicate the operator should slow pace, difference artist set for a too fast detection, among others).

Figure 10:
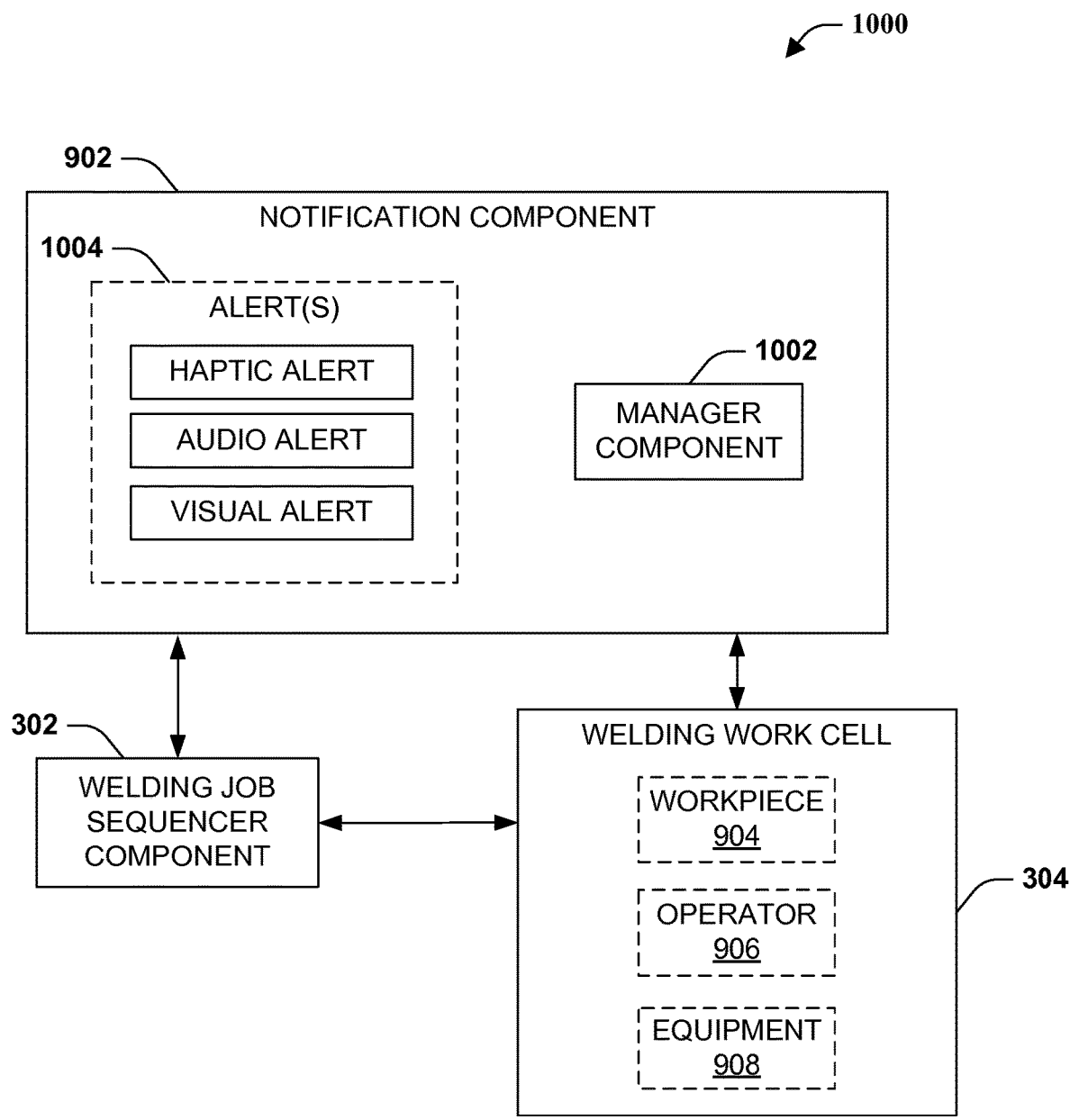
FIG. 10 is a block diagram illustrating a system that delivers an alert to an operator creating a weld with a welding sequence based on a condition within a welding work cell.

FIG. 10 illustrates system 1000 that delivers an alert to an operator creating a weld with a welding sequence based on a condition within a welding work cell. System 1000 includes notification component 902 that further includes manager component 1002 that is configured to evaluate a condition in welding work cell 304. Manager component 1002 can select one or more alert(s) 1004 to communicate to welding work cell 304 based on a detected condition therein. For instance, if sound levels within welding work cell 304 are high, a visual alert or haptic alert can be communicated. In another example, if operator 906 is positioned away from a display or not in view of the display, an audio alert and/or haptic alert can be communicated. In another example, if operator 908 is away from welding work cell 304 (out of range for an audio alert and/or visual alert), a haptic alert can be communicated via a wireless device or portable device (e.g., worn on operator 906, incorporated into equipment of the operator, among others). For instance, a haptic feedback (e.g., a motion, vibration, movement, and the like) to the operator can communicate to the operator by notification component 902.

In another embodiment, an urgency of the alert can determine which alert (e.g., audio, visual, haptic, and/or combination thereof) to communicate. For instance, an evacuation alert can be communicated with an audio alert, a visual alert, and a haptic alert. A less urgent alert can be communicated with a haptic alert as such alert does not disrupt or distract other operators other than the receiving operator. It is to be appreciated that manager component 1002 can include pre-defined settings for alerts, conditions, among others. Moreover, manager component 1002 can collect real time data and automatically adjust based on operator preferences.

Figure 11:
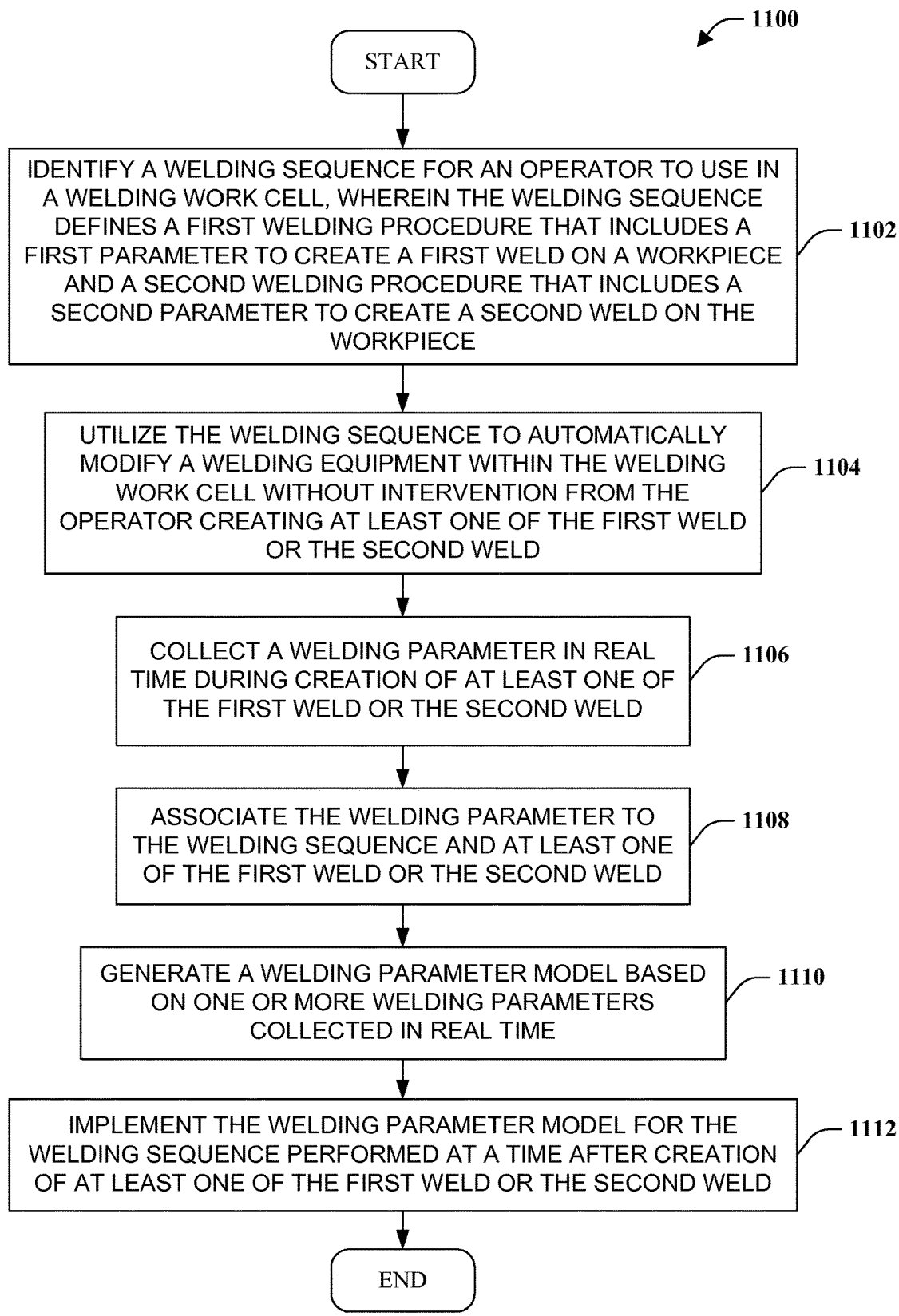
FIG. 11 is a flow diagram of identifying a welding parameter model for a welding sequence based on one or more welding parameters collected in real time for the welding sequence used to create at least one weld.
Figure 12:
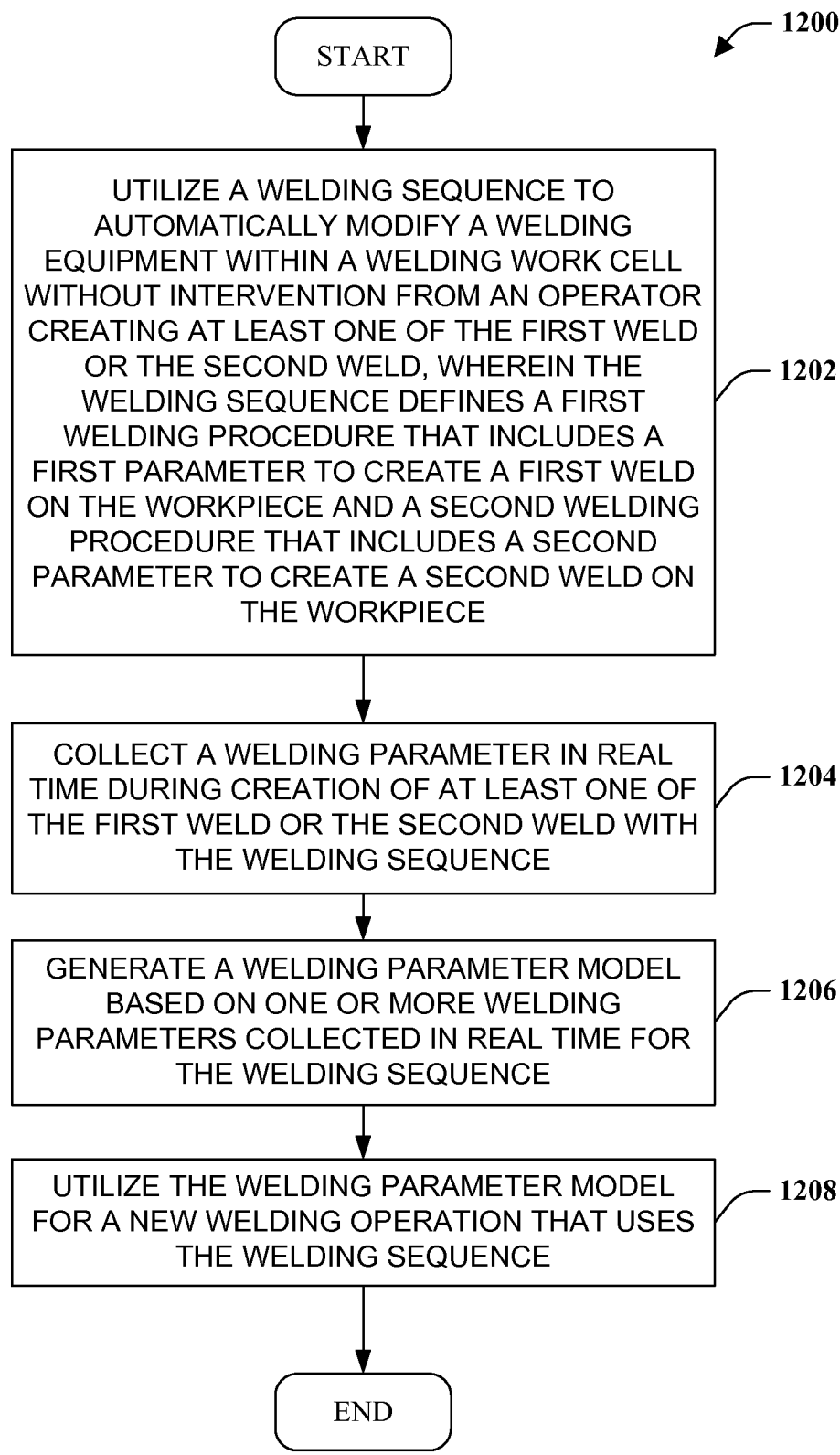
FIG. 12 is a flow diagram of creating a welding parameter model for a welding sequence based on one or more parameters collected from a previous welding operation that used the welding sequence.

In view of the exemplary devices and elements described supra, methodologies that may be implemented in accordance with the disclosed subject matter will be better appreciated with reference to the flow charts and/or methodologies of FIGS. 11 and 12. The methodologies and/or flow diagrams are shown and described as a series of blocks, the claimed subject matter is not limited by the order of the blocks, as some blocks may occur in different orders and/or concurrently with other blocks from what is depicted and described herein. In an embodiment, a first input can be received prior to a second input (as described below). In another embodiment, a second input can be received prior to a first input. In an embodiment, the a first input and a second input can be received at substantially the same time. Moreover, not all illustrated blocks may be required to implement the methods and/or flow diagrams described hereinafter.

Sequentially, the following occurs as illustrated in the decision tree flow diagram 1100 of FIG. 11 which is a flow diagram 1100 that identifies a welding parameter model for a welding sequence based on one or more welding parameters collected in real time for the welding sequence used to create at least one weld. Methodology 1100 collects data (e.g., welding parameter) during a welding operation using a welding sequence in order to generate a welding parameter model (e.g., also referred to as a modeled welding parameter) used with the welding sequence (e.g., at a later point in time), wherein the welding parameter model is based on the collected data. A welding sequence for an operator to use in a welding work cell is identified, wherein the welding sequence defines a first welding procedure that includes a first parameter to create a first weld on a workpiece and a second welding procedure that includes a second parameter to create a second weld on the workpiece (reference block 1102). The welding sequence is utilized to automatically modify a welding equipment within the welding work cell without intervention from the operator creating at least one of the first weld or the second weld (reference block 1104). A welding parameter is collected in real time during creation of at least one of the first weld or the second weld (reference block 1106). The welding parameter is associated to the welding sequence and at least one of the first weld or the second weld (reference block 1108). A welding parameter model is generated based on one or more welding parameters collected in real time (reference block 1110). The welding parameter model is implemented for the welding sequence performed at a time after creation of at least one of the first weld or the second weld (reference block 1112).

The following occurs as illustrated in the flow diagram 1200 of FIG. 12. Flow diagram 1200 relates to creating a welding parameter model for a welding sequence based on one or more parameters collected from a previous welding operation that used the welding sequence. A welding sequence is utilized to automatically modify a welding equipment within a welding work cell without intervention from an operator creating at least one of the first weld or the second weld, wherein the welding sequence defines a first welding procedure that includes a first parameter to create a first weld on the workpiece and a second welding procedure that includes a second parameter to create a second weld on the workpiece (reference block 1202). A welding parameter is collected in real time during creation of at least one of the first weld or the second weld with the welding sequence (reference block 1204). A welding parameter model is generated based on one or more welding parameters collected in real time for the welding sequence (reference block 1206). The welding parameter model is utilized for a new welding operation that uses the welding sequence (reference block 1208).

In an embodiment, the method can include at least the steps of displaying a portion of media illustrating performance of the welding parameter model, wherein the portion of media is at least one of a video, an image, a picture, a holographic image, a holographic video, a 3 dimensional (3D) image, or a 3D video. In an embodiment, the method can include at least the steps of monitoring the welding work cell to identify a condition related to a noise level, an activity of the operator, or a location of the operator; and communicating an alert to the operator based on the condition, wherein the alert is based on at least one of the welding sequence, a creation of an additional weld, or a real time comparison of an additional weld created with the welding parameter model.

By way of example and not limitation, welding equipment (e.g., controller for a welder power source, wire feeder, welder power source, among others) can include one or more steps related to a particular welding process for a specific workpiece, wherein a step can include a respective setting or configuration for at least one welding equipment. For instance, a first workpiece can include steps A, B, C, and D based on welding parameters desired, the welding process used, and/or the workpiece. In another example, a second workpiece can include steps B, C, A, E, and F. With the employment of a welding sequence, the controller implementing the steps for the welding process via the welder power source and/or welding equipment can be managed and/or instructed. For instance, the welding sequence can indicate at least one of the following: which steps to perform, redo a step, skip a step, pause a sequence of steps, among others. Furthermore, a controller (e.g., or other suitable component) can control one or more welder power sources, parameters, welding schedules, among others associated with one or more welding processes, wherein each welding process can have a corresponding welding sequence (s).

In an embodiment, a system can include a weld score component that is configured to evaluate at least one of the first weld or the second weld performed on the workpiece by the operator based upon at least one of an image of the first weld or the second weld or a user inspection. In an embodiment, the collection component associates a portion of the evaluation to the identified welding sequence and at least one of the first weld or the second weld. In an embodiment, the system can include a check point component that is configured to monitor the operator and creation of at least one of the first weld or the second weld in real time using the welding sequence and the collection component that associates a portion of the monitoring to the identified welding sequence and at least one of the first weld or the second weld.

In an embodiment, the system can include the welding job sequencer component that is further configured to communicate an instruction to the operator of the welding work cell to assemble the workpiece with the first welding procedure and the second welding procedure having two separate welding schedules, wherein the instruction includes at least one of the portion of the monitoring or the portion of the evaluation.

In an embodiment, the system can include a quality manager component that is configured to evaluate the real time welding parameter for at least one of the first weld or the second weld created with the welding sequence and identify a welding parameter model. In an embodiment, the welding parameter model is based on an average measurement of the real time welding parameter. In an embodiment, the welding parameter model is a defined range of values based on the real time welding parameter. In an embodiment, the welding parameter model includes a threshold tolerance based on the real time welding parameter. In an embodiment, the collection component associates the welding parameter model to the identified welding sequence and at least one of the first weld or the second weld. In an embodiment, the quality manager component is further configured to receive the real time welding parameter to utilize as the welding parameter model.

In an embodiment, the system can include a guide component that is configured to collect a portion of media captured during creation of the welding parameter model during at least one of the first weld or the second weld. In an embodiment, the guide component displays the portion of media on an equipment of the operator as at least one of a video, a portion of audio, a 3 dimensional (3D) image, a hologram, or an image.

In an embodiment, the system can include a notification component that is configured to generate an alert to the operator based on at least one of the welding sequence, a performance of the first weld or the second weld, or a comparison of the real time welding parameter with a welding parameter model calculated based on historic welding parameter data for the welding sequence. In an embodiment, the notification component is further configured to communicate the alert to the operator based on an urgency of the alert or a condition within the welding work cell.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welder system, comprising:
a processor; and
a non-transitory computer readable medium storing instructions for the processor to execute, the instructions comprising:
a quality manager component that is configured to receive at least two measurements of a welding parameter associated with a weld, automatically create a welding parameter model based on statistical analysis of the at least two measurements of the welding parameter, wherein the welding parameter model comprises a target value for the welding parameter, and automatically implement the welding parameter model for use during a welding sequence;
a welding job sequencer component that is configured to employ the welding sequence for a welding work cell to perform at least a first weld and a second weld, wherein the welding sequence defines at least:
a first weld schedule having a first welding parameter;
a second weld schedule having a second welding parameter, wherein the second welding parameter is different from the first welding parameter; and
a quality assurance collection of the first welding parameter;
wherein the collected first welding parameter is evaluated based on the welding parameter model; and
the welder system configured to employ the welding sequence for the welding work cell to perform welds to assemble a workpiece by automatically adjusting a setting on a welding equipment within the welding work cell.

2. The welder system of claim 1, wherein the welding parameter model is based on an average measurement of the welding parameter.

3. The welder system of claim 1, wherein the welding parameter model is a defined range of values based on the measurements of the welding parameter.

4. The welder system of claim 1, wherein the welding parameter model includes a threshold tolerance based on the measurements of the welding parameter.

5. The welder system of claim 1, further comprising a collection component that is configured to collect the welding parameter in real time.

6. The welder system of claim 1, wherein the quality manager component is further configured to collect the welding parameter in real time.

7. The welder system of claim 6, further comprising a guide component that is configured to collect a portion of media captured during creation of the welding parameter model during at least one of the first weld or the second weld.

8. The welder system of claim 7, wherein the guide component displays the portion of media on an equipment of an operator as at least one of a video, a portion of audio, a 3 dimensional (3D) image, a hologram, or an image.

9. A welder system, comprising:
means for executing computer readable instructions; and
means for storing the computer readable instructions, the instructions comprising:
automatically creating a welding parameter model based on statistical analysis of at least two measurements of a welding parameter, wherein the welding parameter model comprises a target value for the welding parameter;

automatically implementing the welding parameter model for use during a welding sequence;

employing the welding sequence for a welding work cell to perform at least a first weld and a second weld, wherein the welding sequence defines at least:

a first weld schedule having a first welding parameter;

a second weld schedule having a second welding parameter, wherein the second welding parameter is different from the first welding parameter; and a quality assurance collection of the first welding parameter;

wherein the collected first welding parameter is evaluated based on the welding parameter model;

means for employing the welding sequence for the welding work cell to perform at least the first weld and the second weld by automatically adjusting a setting on a welding equipment within the welding work cell.

10. The welder system of claim 5, wherein the collection component is configured to collect the welding parameter during at least one of a training session, a virtual welding session, a welding simulation, and a model welding session.

11. The welder system of claim 1, wherein the welding parameter model is based on a standard deviation of the at least two measurements of the welding parameter.

12. The welder system of claim 1, wherein the welding parameter model is different than the at least two measurements of the welding parameter.

13. The welder system of claim 1, wherein the at least two measurements of the welding parameter are collected in a first welding environment and the welding parameter model based on the at least two measurements collected in the first welding environment is used in a second welding environment different than the first welding environment.

14. The welder system of claim 1, wherein the welding parameter comprises at least one of a parameter for a weld, a weld schedule parameter, a welding tool position, an operator movement, a welding equipment position or location, an operator position or location, an operator body part position or location, a welding equipment configuration, a welder setup, a weld creation time, a fixture location, or a welding tool speed.

15. The welder system of claim 5, wherein the collection component associates the welding parameter model to the welding sequence and at least one of the first weld or the second weld.

16. The welder system of claim 1, wherein the welding sequence further comprises an alert notification based on the evaluation of the collected welding parameter.

17. The welder system of claim 1, wherein the welding sequence is automatically created or edited to include a timing of the quality assurance collection based on the evaluation of the collected welding parameter.

18. The welder system of claim 1, wherein the welding job sequencer component automatically implements a repeat function into the welding sequence based on the evaluation of the collected first welding parameter, wherein the repeat function instructs an operator to repeat at least one of the first weld and the second weld.

19. The welder system of claim 1, wherein the welding job sequencer component automatically implements a repair function into the welding sequence based on the evaluation of the collected first welding parameter, wherein the repair function instructs an operator to repair at least one of the first weld and the second weld.

20. The welder system of claim 1, wherein the welding job sequencer component automatically implements an enter job information function into the welding sequence based on the evaluation of the collected first welding parameter, wherein the enter job information function instructs an operator to enter information regarding at least one of the first weld and the second weld before the welding sequence continues.

* * * * *